United States Patent
Barker, Jr. et al.

(10) Patent No.: US 11,340,939 B1
(45) Date of Patent: May 24, 2022

(54) APPLICATION-AWARE ANALYTICS FOR STORAGE SYSTEMS

(71) Applicant: PURE STORAGE, INC., Mountain View, CA (US)

(72) Inventors: Robert Barker, Jr., Cupertino, CA (US); Andrew Sillifant, Nottingham (GB)

(73) Assignee: PURE STORAGE, INC., Mountain View, CA (US)

( * ) Notice: Subject to any disclaimer, the term of this patent is extended or adjusted under 35 U.S.C. 154(b) by 106 days.

(21) Appl. No.: 16/707,611

(22) Filed: Dec. 9, 2019

Related U.S. Application Data

(63) Continuation-in-part of application No. 16/174,488, filed on Oct. 30, 2018, and a continuation-in-part of application No. 15/987,875, filed on May 23, 2018.

(60) Provisional application No. 62/674,688, filed on May 22, 2018, provisional application No. 62/674,703, filed on May 22, 2018, provisional application No. 62/575,966, filed on Oct. 23, 2017, provisional application No. 62/549,399, filed on Aug. 23, 2017, provisional application No. 62/518,146, filed on Jun. 12, 2017.

(51) Int. Cl.
*G06F 9/455* (2018.01)
*G06F 9/48* (2006.01)
*G06F 9/50* (2006.01)
*G06F 3/06* (2006.01)

(52) U.S. Cl.
CPC .......... *G06F 9/4856* (2013.01); *G06F 3/0604* (2013.01); *G06F 3/067* (2013.01); *G06F 3/0647* (2013.01); *G06F 9/5016* (2013.01); *G06F 2209/501* (2013.01)

(58) Field of Classification Search
None
See application file for complete search history.

(56) References Cited

U.S. PATENT DOCUMENTS

| | | | |
|---|---|---|---|
| 5,706,210 | A | 1/1998 | Kumano et al. |
| 5,799,200 | A | 8/1998 | Brant et al. |
| 5,933,598 | A | 8/1999 | Scales et al. |

(Continued)

FOREIGN PATENT DOCUMENTS

| | | |
|---|---|---|
| EP | 0725324 A2 | 8/1996 |
| WO | WO-2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Kenneth Tang

(57) ABSTRACT

Providing application-aware analytics for storage systems, including: collecting, by a workload migration module, from a first host, first data describing performance characteristics of the first host and second data describing performance characteristics of one or more clients connected to the first host and associated with a workload supported by the first host; identifying, based on the data, a second host for servicing the workload; and deploying the workload in the second host.

15 Claims, 25 Drawing Sheets

(56) References Cited

U.S. PATENT DOCUMENTS

| | | |
|---|---|---|
| 6,012,032 A | 1/2000 | Donovan et al. |
| 6,085,333 A | 7/2000 | DeKoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,200,887 B2 | 6/2012 | Bennett |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,856,335 B1 | 10/2014 | Yadwadkar et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,235,611 B1 | 1/2016 | Murray et al. |
| 9,250,823 B1 | 2/2016 | Kamat et al. |
| 9,274,918 B2 | 3/2016 | Heilper et al. |
| 9,300,660 B1 | 3/2016 | Borowiec et al. |
| 9,311,182 B2 | 4/2016 | Bennett |
| 9,444,822 B1 | 9/2016 | Borowiec et al. |
| 9,450,876 B1 | 9/2016 | Marr |
| 9,507,532 B1 | 11/2016 | Colgrove et al. |
| 9,507,631 B2 | 11/2016 | Chen et al. |
| 9,632,870 B2 | 4/2017 | Bennett |
| 9,753,987 B1 | 9/2017 | Dolan et al. |
| 9,805,054 B2 | 10/2017 | Davis et al. |
| 10,353,745 B1 | 7/2019 | Sait |
| 10,355,946 B1 | 7/2019 | Dolas et al. |
| 10,693,759 B2 * | 6/2020 | Baughman .......... H04L 43/0876 |
| 10,853,148 B1 | 12/2020 | Kenney et al. |
| 10,884,636 B1 | 1/2021 | Abrol et al. |
| 11,016,824 B1 | 5/2021 | Wells et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0025176 A1 | 2/2004 | Franklin et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077687 A1 | 3/2008 | Marvasti |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0005342 A1 | 1/2010 | Dambra et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0035072 A1 | 2/2011 | Jackson |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2011/0314269 A1 | 12/2011 | Stavrou et al. |
| 2011/0321166 A1 | 12/2011 | Capalik et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0259976 A1 | 10/2012 | Bhagat et al. |
| 2012/0284408 A1 | 11/2012 | Dutta et al. |
| 2012/0303919 A1 | 11/2012 | Hu et al. |
| 2012/0311000 A1 | 12/2012 | Post et al. |
| 2012/0331476 A1 | 12/2012 | Saffre |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0055278 A1 | 2/2013 | Zaitsev |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0312006 A1 | 11/2013 | Hardman et al. |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |

(56) References Cited

U.S. PATENT DOCUMENTS

| | | |
|---|---|---|
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0298349 A1 | 10/2014 | Jackson |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0019195 A1* | 1/2015 | Davis ............... G06F 11/3447 703/17 |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0229586 A1 | 8/2015 | Jackson |
| 2015/0347183 A1 | 12/2015 | Borthakur |
| 2015/0378888 A1 | 12/2015 | Zhang et al. |
| 2016/0087910 A1 | 3/2016 | Mittal et al. |
| 2016/0098323 A1 | 4/2016 | Mutha et al. |
| 2016/0218928 A1 | 7/2016 | Jain et al. |
| 2016/0259665 A1 | 9/2016 | Gaurav et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352854 A1 | 12/2016 | Borowiec et al. |
| 2017/0126795 A1 | 5/2017 | Kumar et al. |
| 2017/0192872 A1 | 7/2017 | Awad et al. |
| 2017/0242592 A1 | 8/2017 | Camp et al. |
| 2018/0081562 A1 | 3/2018 | Vasudevan |
| 2018/0107410 A1* | 4/2018 | Barajas Gonzalez ... G06F 3/067 |
| 2018/0189101 A1 | 7/2018 | Xu et al. |
| 2018/0213036 A1 | 7/2018 | Vasetsky et al. |
| 2018/0217778 A1* | 8/2018 | Kusbel ............... G06F 3/061 |
| 2019/0272002 A1 | 9/2019 | Seenappa et al. |
| 2020/0028935 A1 | 1/2020 | Sahay et al. |
| 2021/0326047 A1 | 10/2021 | Sillifant et al. |

FOREIGN PATENT DOCUMENTS

| | | |
|---|---|---|
| WO | WO-2013071087 A1 | 5/2013 |
| WO | WO-2014/110137 A1 | 7/2014 |
| WO | WO-2016/015008 A1 | 12/2016 |
| WO | WO-2016/190938 A1 | 12/2016 |
| WO | WO-2016/195759 A1 | 12/2016 |
| WO | WO-2016/195958 A1 | 12/2016 |
| WO | WO-2016/195961 A1 | 12/2016 |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, *Convergent Encryption*, Wikipedia.org (online), accessed Septembers, 2015, 2 pages, URL: en.wikipedia.org/wiki/Convergent_encryption.

Storer et al., *Secure Data Deduplication*, Proceedings of the 4th ACM International Workshop on Storage Security and Survivability (StorageSS'08), Oct. 2008, 10 pages, ACM New York, NY. USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Bellamy-Mcintyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Kong, *Using PCI Express as the Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Jul. 18, 2016, 12 pages.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

(56) References Cited

OTHER PUBLICATIONS

Roy et al., Reducing Service Failures By Failure and Workload Aware Load Balancing in SaaS Clouds, 2013, IEEE, 6 pages.

* cited by examiner

US 11,340,939 B1

APPLICATION-AWARE ANALYTICS FOR STORAGE SYSTEMS

CROSS-REFERENCE TO RELATED APPLICATIONS

This application is a continuation-in-part of U.S. patent application Ser. No. 16/174,488, filed Oct. 30, 2018, which is a non-provisional application for patent entitled to a filing date and claiming the benefit of earlier-filed U.S. Provisional Patent Application Ser. No. 62/674,703, filed May 22, 2018, and is a continuation-in-part application of and claims priority from U.S. patent application Ser. No. 15/987,875, filed May 23, 2018, which claims the benefit of: U.S. Provisional Patent Application Ser. No. 62/518,146, filed Jun. 12, 2017, U.S. Provisional Patent Application Ser. No. 62/549,399, filed Aug. 23, 2017, U.S. Provisional Patent Application Ser. No. 62/575,966, filed Oct. 23, 2017, and U.S. Provisional Patent Application Ser. No. 62/674,688, filed May 22, 2018.

DESCRIPTION OF EMBODIMENTS

Figure 1A:
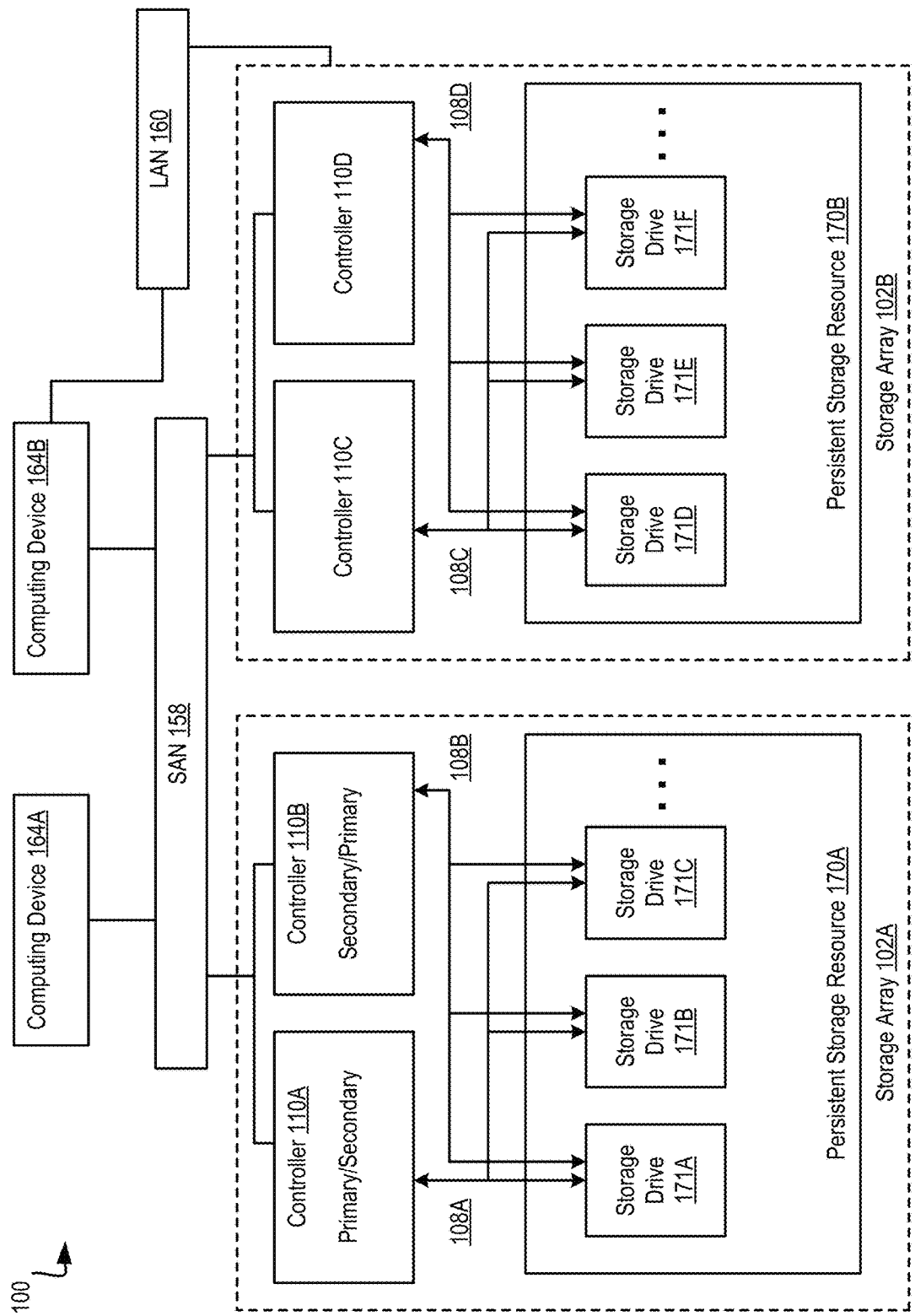
FIG. 1A illustrates a first example system for data storage in accordance with some implementations.

Example methods, apparatus, and products for workload mobility between disparate execution environments in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives (RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives (SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase (PIE') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
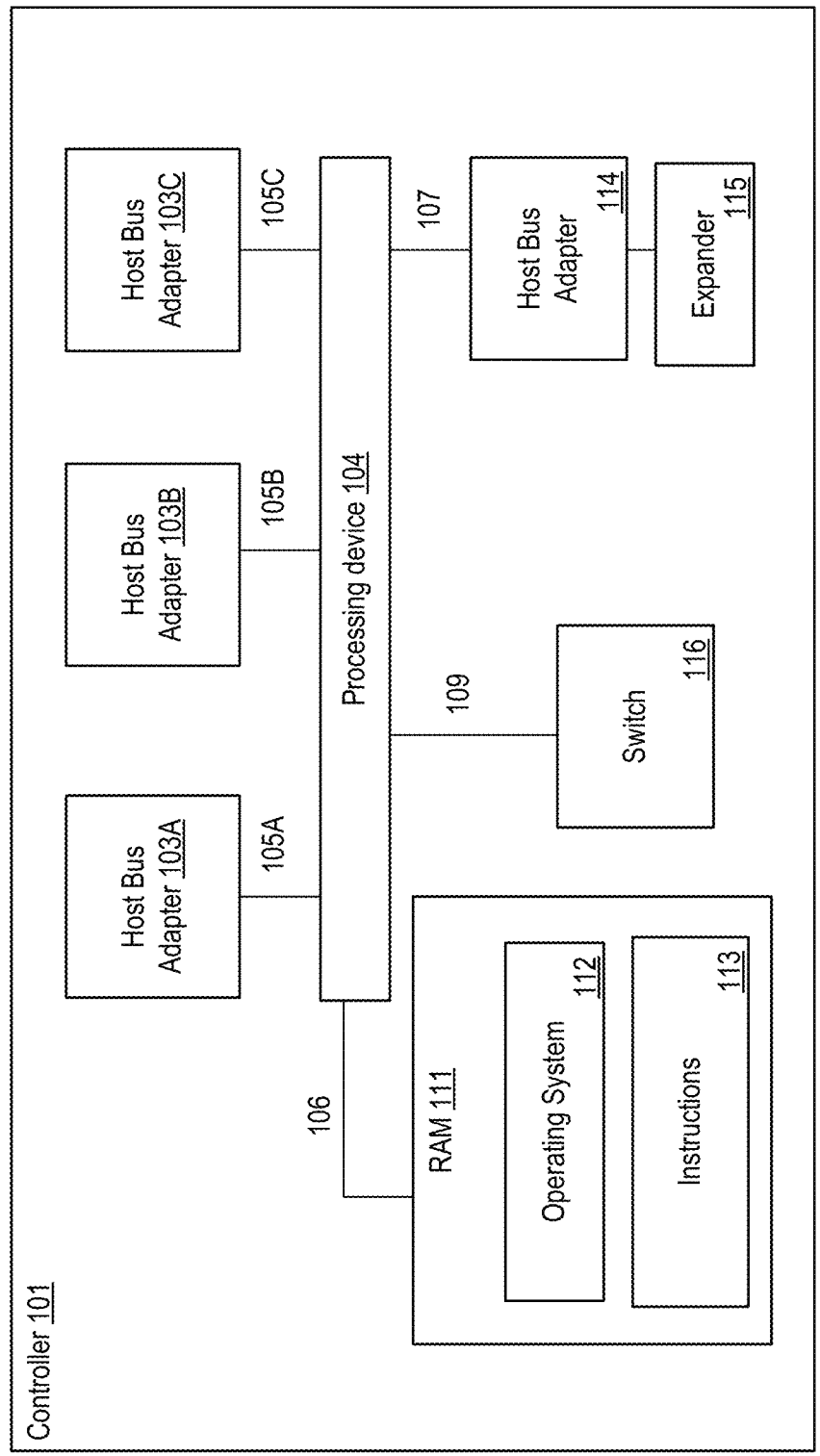
FIG. 1B illustrates a second example system for data storage in accordance with some implementations.

FIG. 1B illustrates an example system for data storage, in accordance with some implementations. Storage array controller 101 illustrated in FIG. 1B may similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
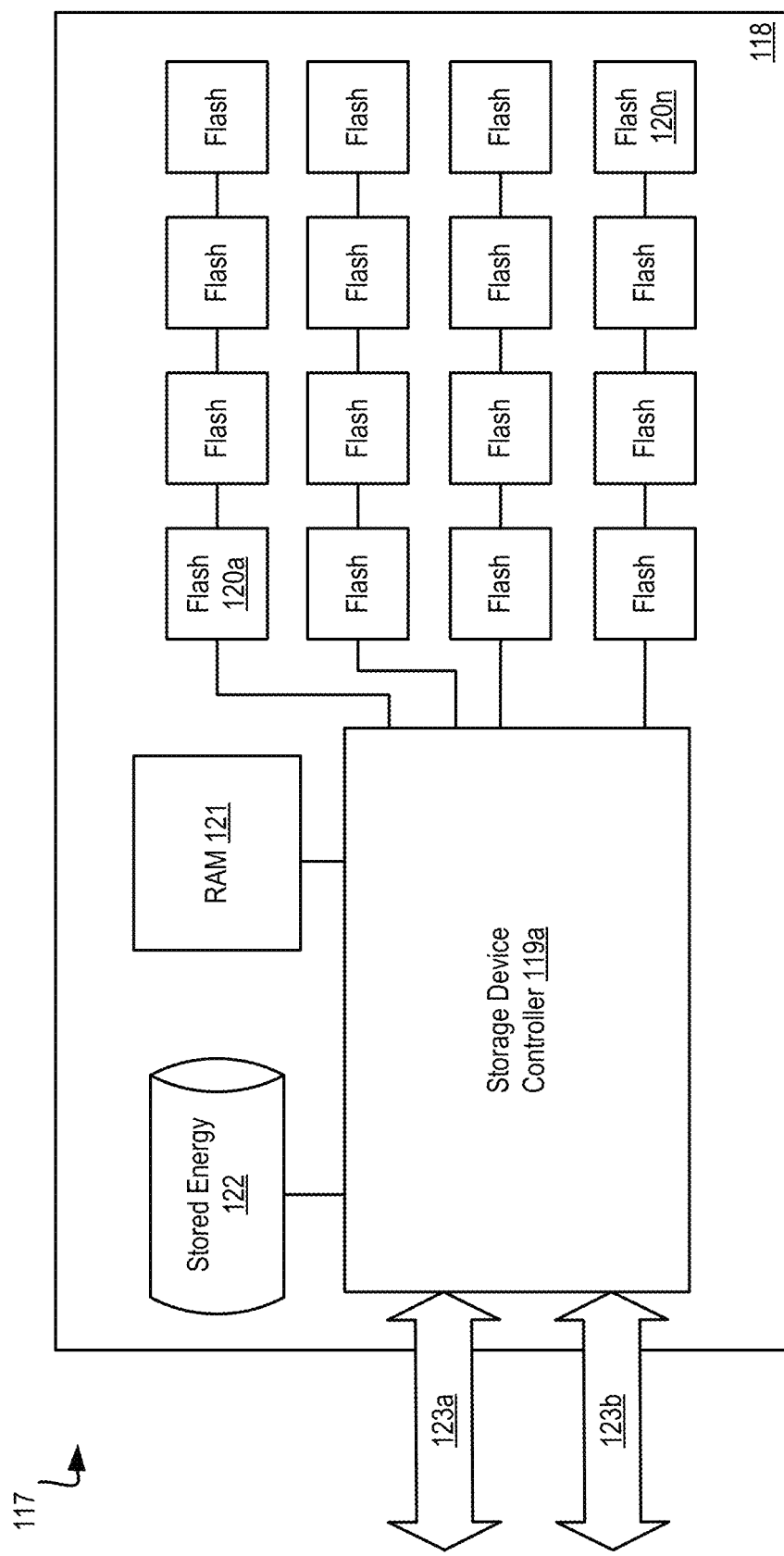
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120*a*-120*n*) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123*a*, 123*b*. In one embodiment, data communications links 123*a*, 123*b* may be PCI interfaces. In another embodiment, data communications links 123*a*, 123*b* may be based on other communications standards (e.g., HyperTransport, InfiniBand, etc.). Data communications links 123*a*, 123*b* may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123*a*, 123*b*, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120*a*-*n*) for long-term persistent storage.

In one embodiment, the logical device may include some presentation of some or all of the content of the Flash memory devices 120*a*-*n*, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120*a*-120*n* stored energy device 122 may power storage device controller 119A-D and associated Flash memory devices (e.g., 120*a*-*n*) for those operations, as well as for the storing of fast-write RAM to Flash memory. Stored energy device 122 may be used to store accumulated statistics and other parameters kept and tracked by the Flash memory devices 120*a*-*n* and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
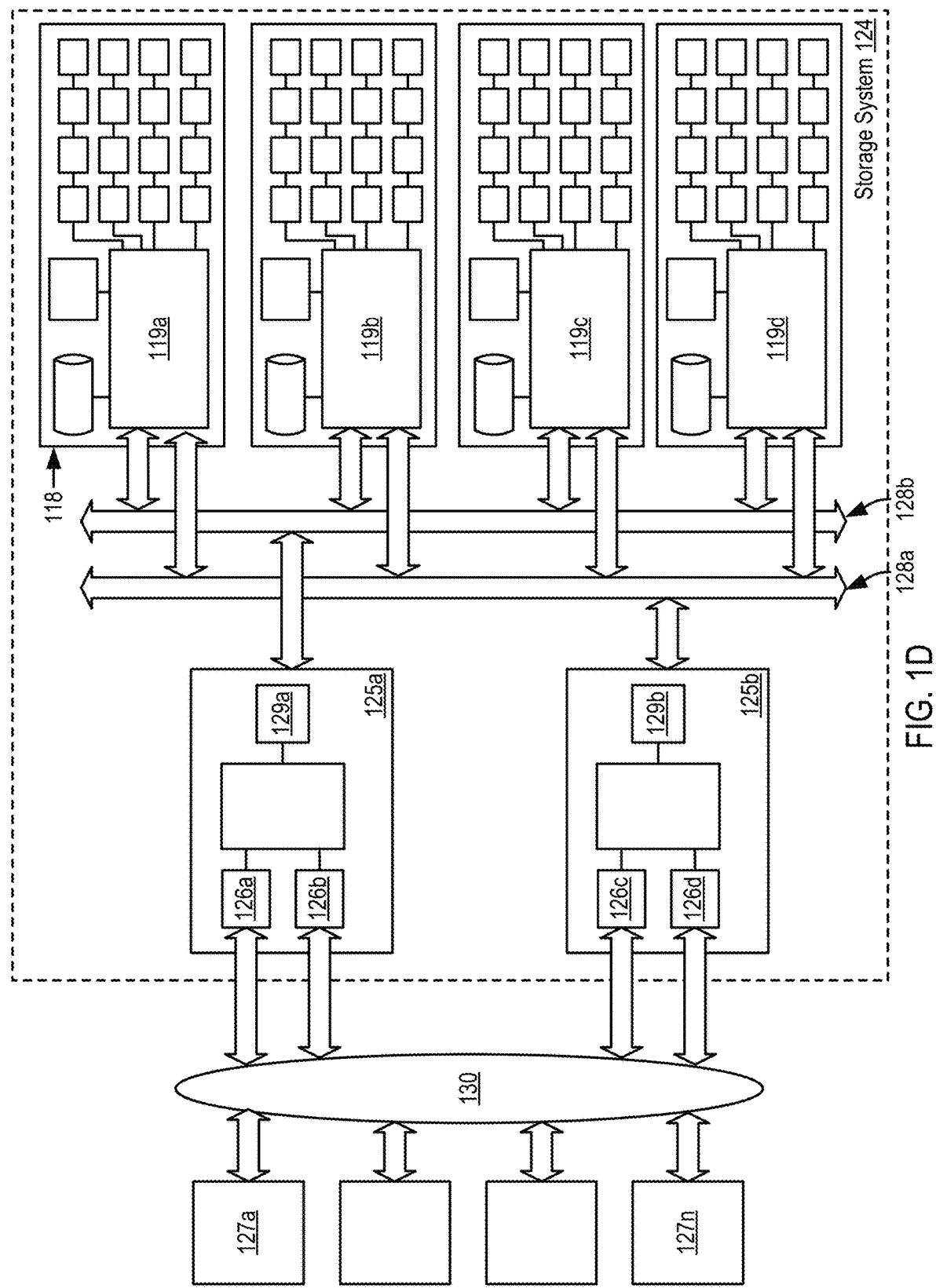
FIG. 1D illustrates a fourth example system for data storage in accordance with some implementations.

FIG. 1D illustrates a third example system 124 for data storage in accordance with some implementations. In one embodiment, system 124 includes storage controllers 125*a*, 125*b*. In one embodiment, storage controllers 125*a*, 125*b* are operatively coupled to Dual PCI storage devices 119*a*, 119*b* and 119*c*, 119*d*, respectively. Storage controllers 125*a*, 125*b* may be operatively coupled (e.g., via a storage network 130) to some number of host computers 127*a*-*n*.

In one embodiment, two storage controllers (e.g., 125*a* and 125*b*) provide storage services, such as a SCS) block storage array, a file server, an object server, a database or data analytics service, etc. The storage controllers 125*a*, 125*b* may provide services through some number of network interfaces (e.g., 126*a*-*d*) to host computers 127*a*-*n* outside of the storage system 124. Storage controllers 125*a*, 125*b* may provide integrated services or an application entirely within the storage system 124, forming a converged storage and compute system. The storage controllers 125*a*, 125*b* may utilize the fast write memory within or across storage devices 119*a*-*d* to journal in progress operations to ensure the operations are not lost on a power failure, storage controller removal, storage controller or storage system shutdown, or some fault of one or more software or hardware components within the storage system 124.

In one embodiment, controllers 125*a*, 125*b* operate as PCI masters to one or the other PCI buses 128*a*, 128*b*. In another embodiment, 128*a* and 128*b* may be based on other communications standards (e.g., HyperTransport, InfiniBand, etc.). Other storage system embodiments may operate storage controllers 125*a*, 125*b* as multi-masters for both PCI buses 128*a*, 128*b*. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119*a* may be operable under direction from a storage controller 125*a* to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128*a*, 128*b*) from the storage controllers 125*a*, 125*b*. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS'), common internet file system (CIF S'), small computer system interface (SCSI') or hypertext transfer protocol (HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control (MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes (TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
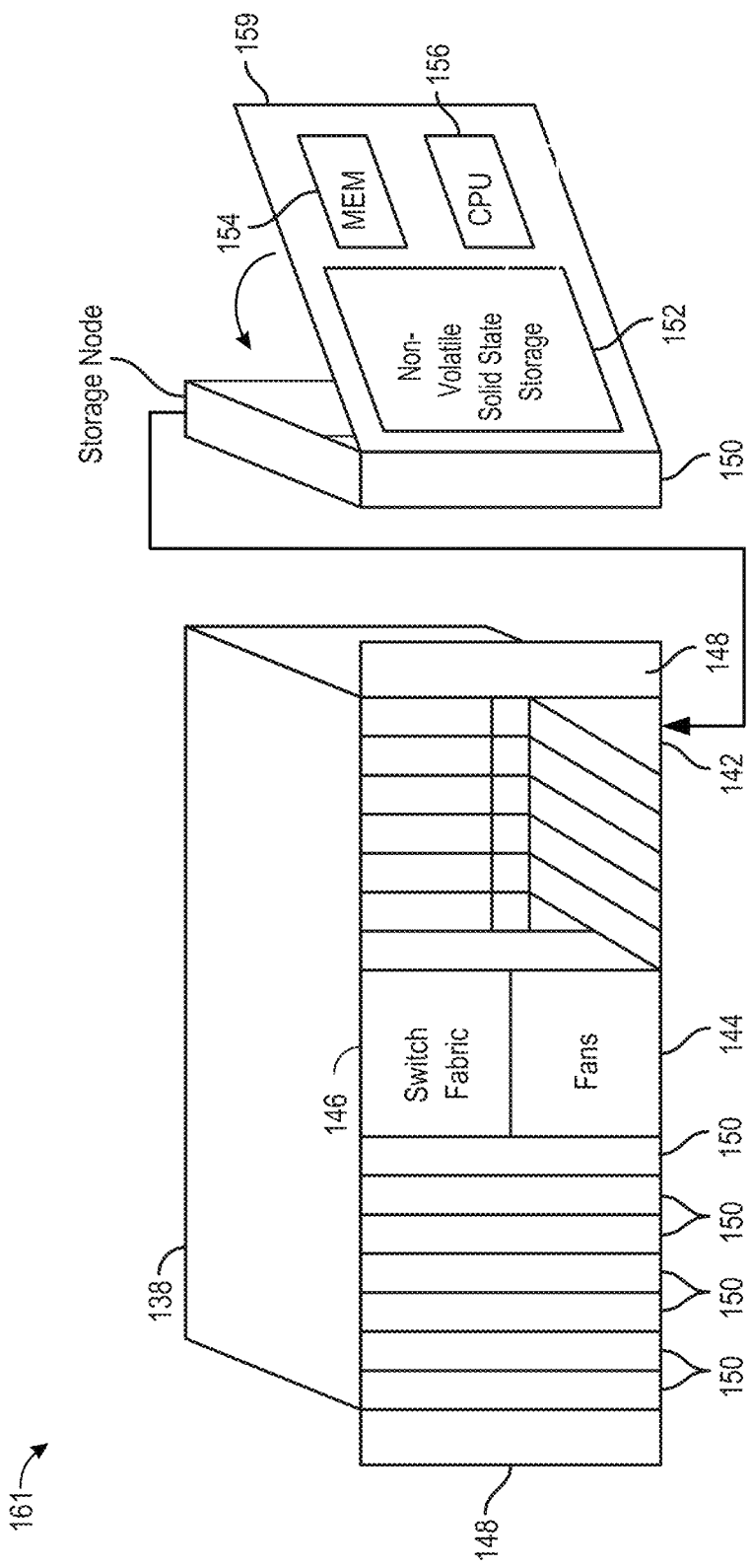
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
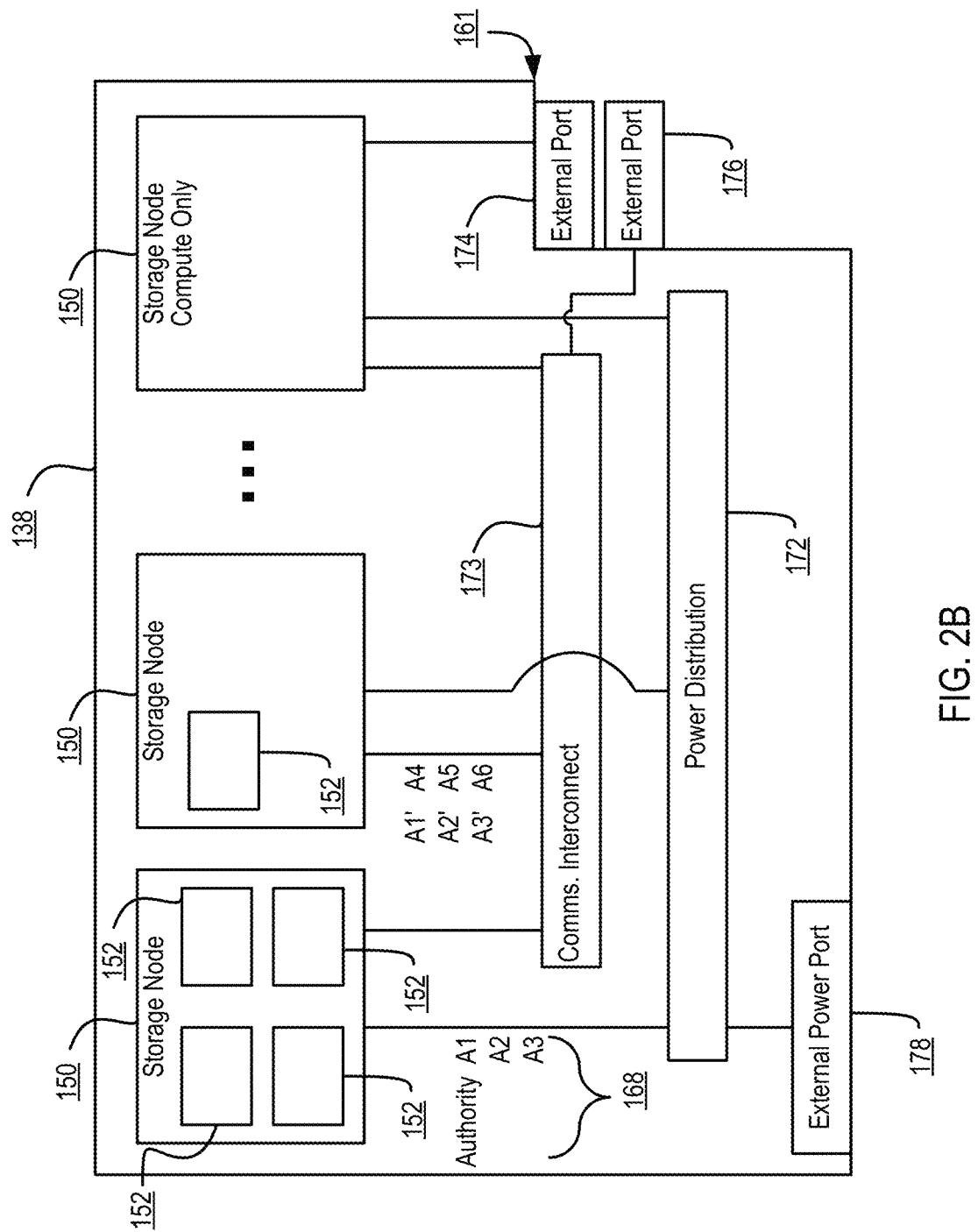
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
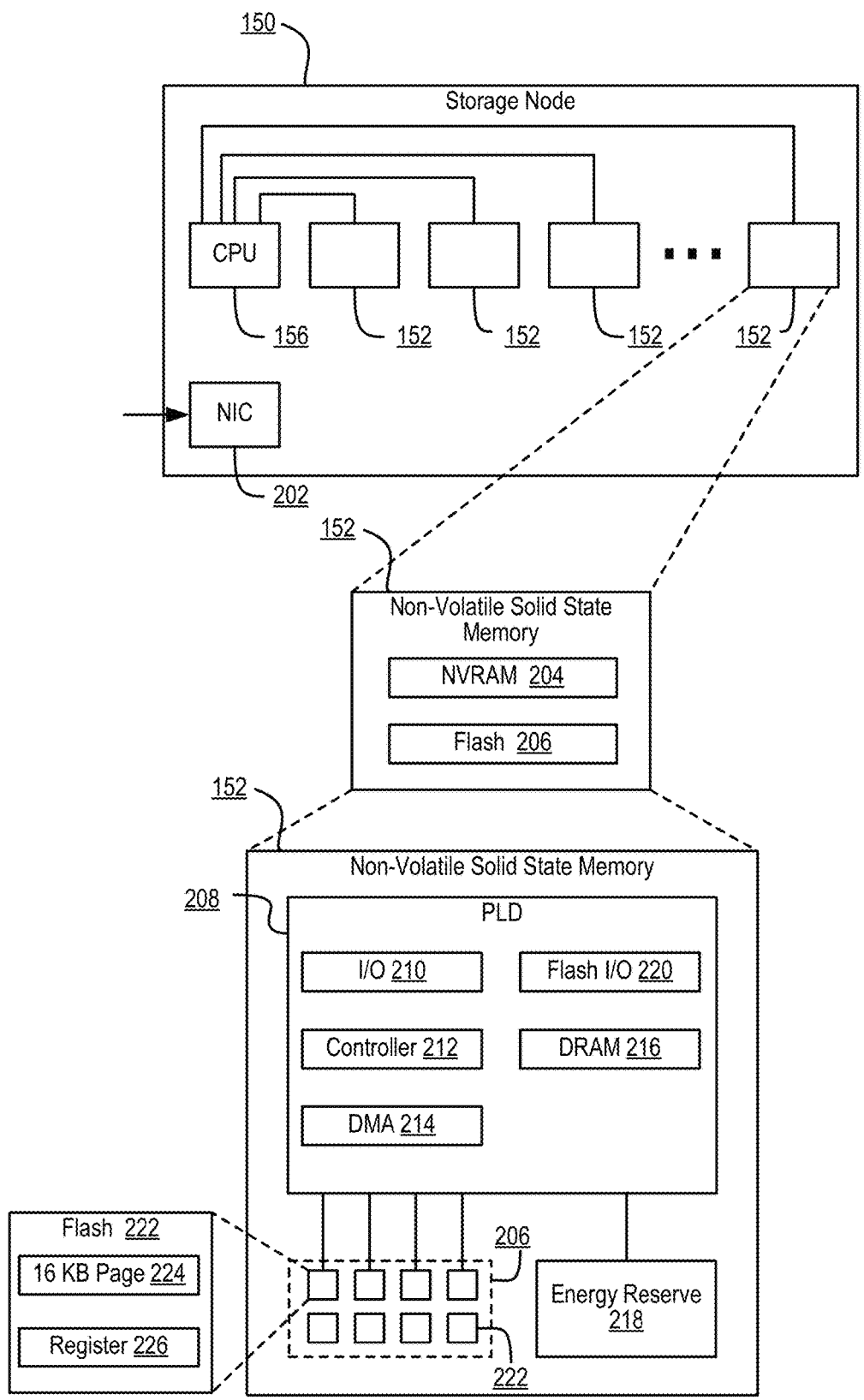
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
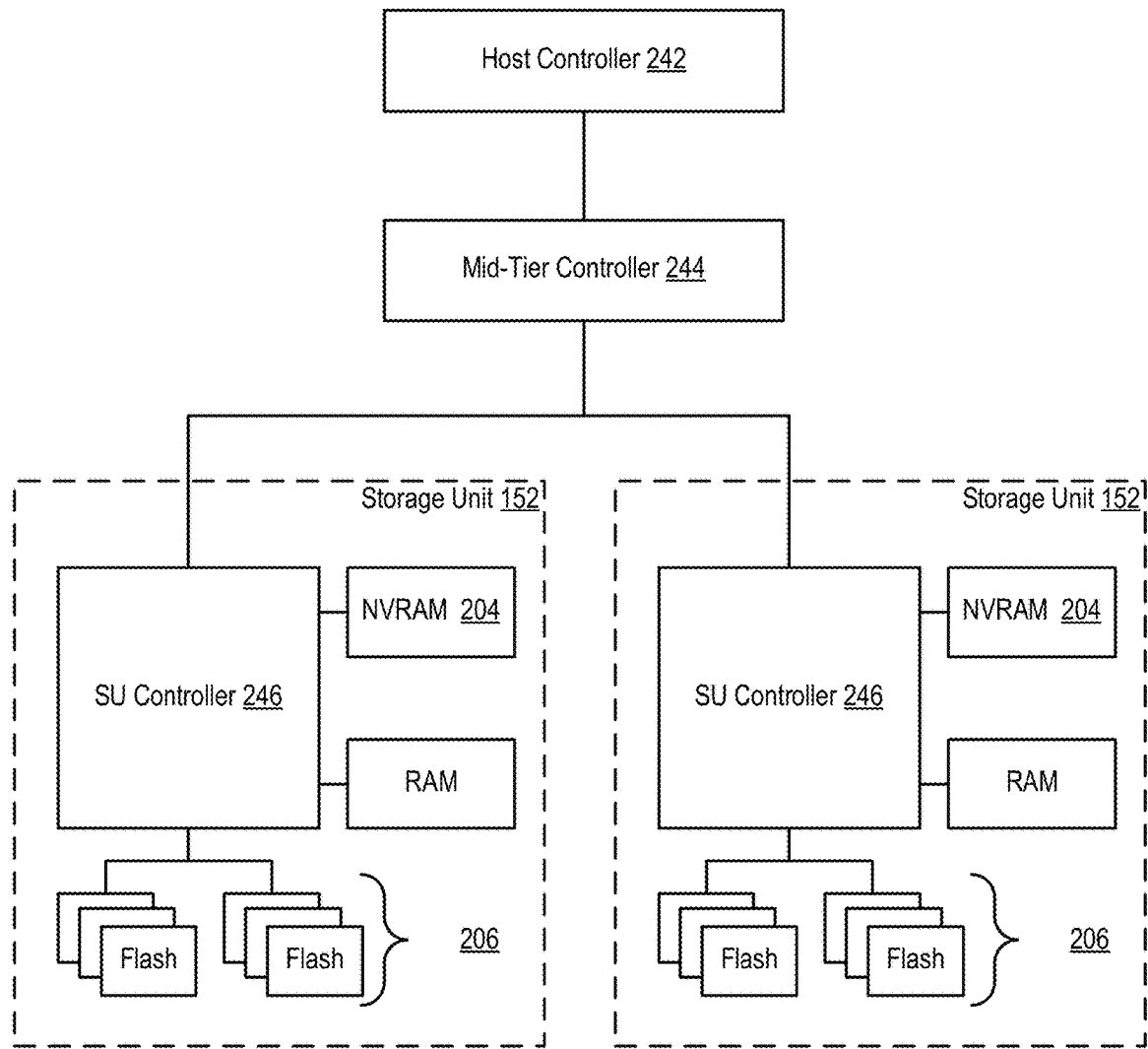
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA, flash memory 206, and NVRAM 204 (which is supercapacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
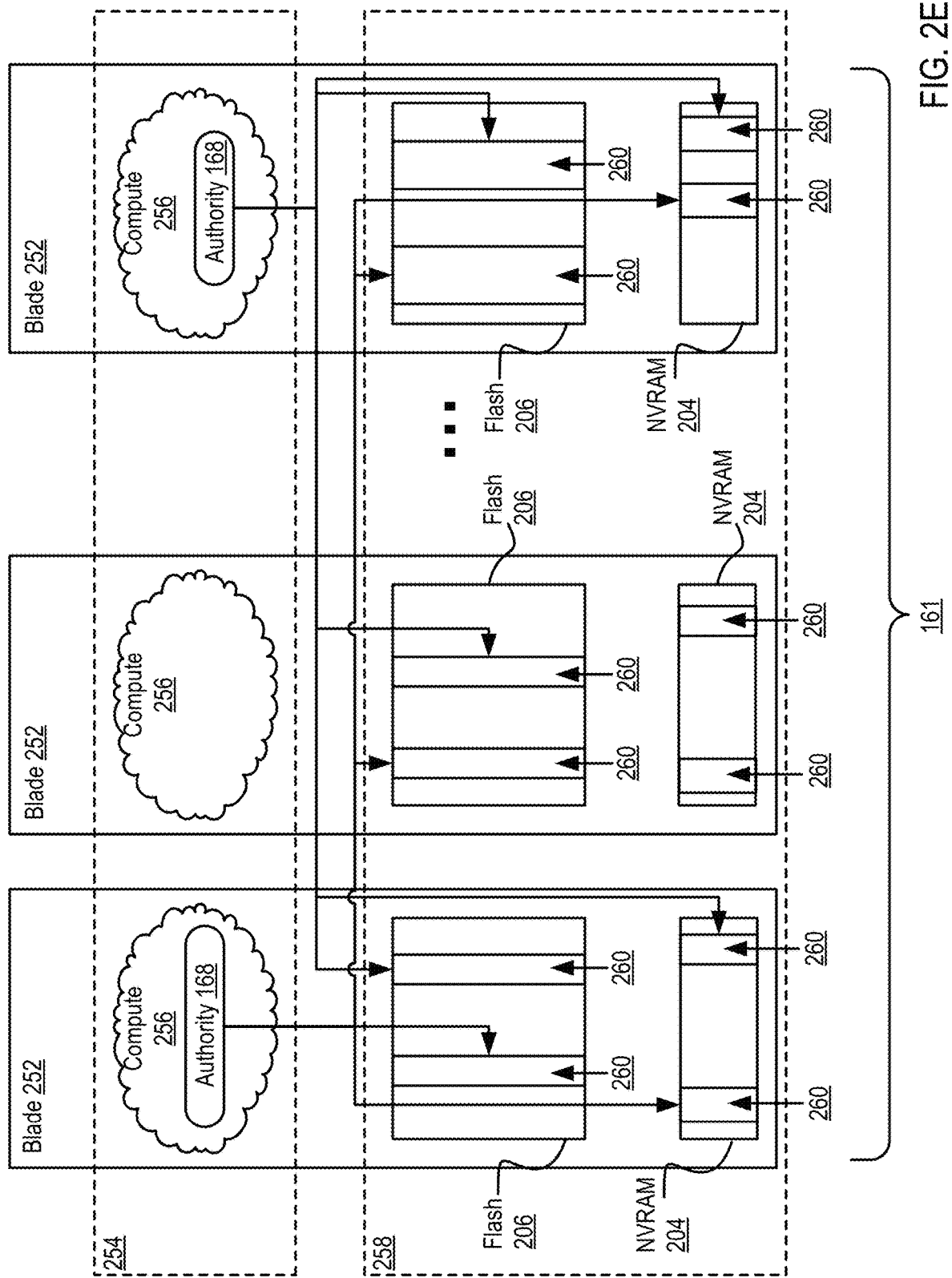
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
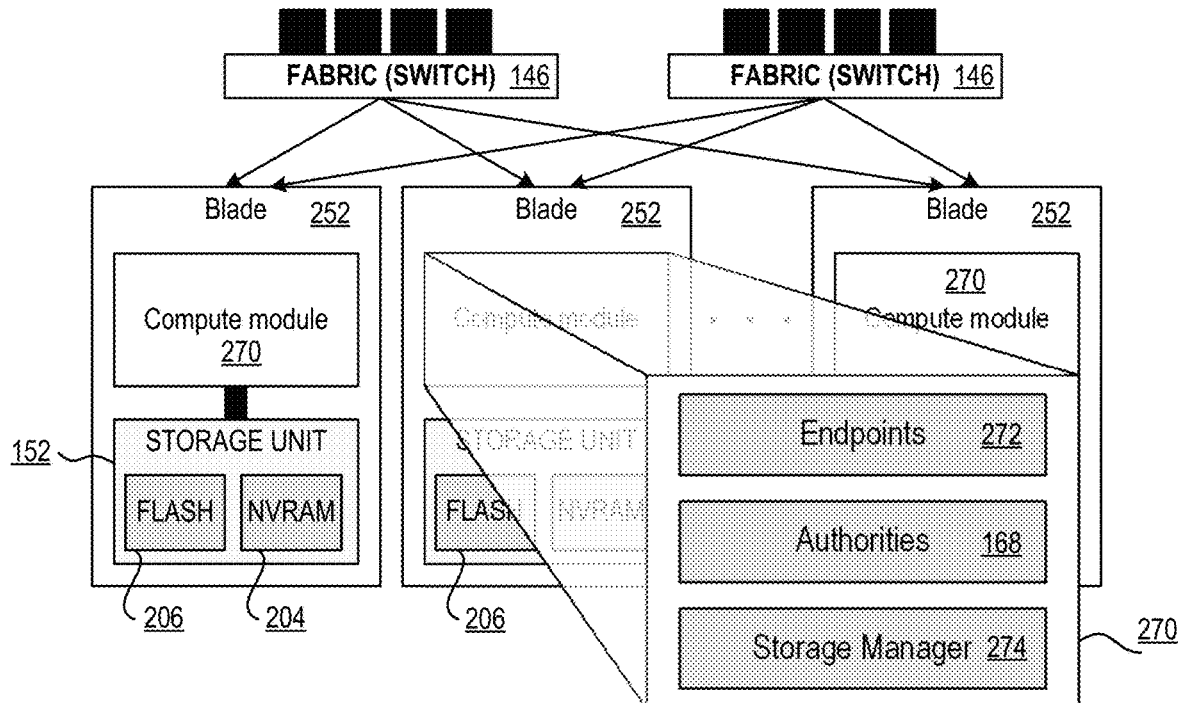
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
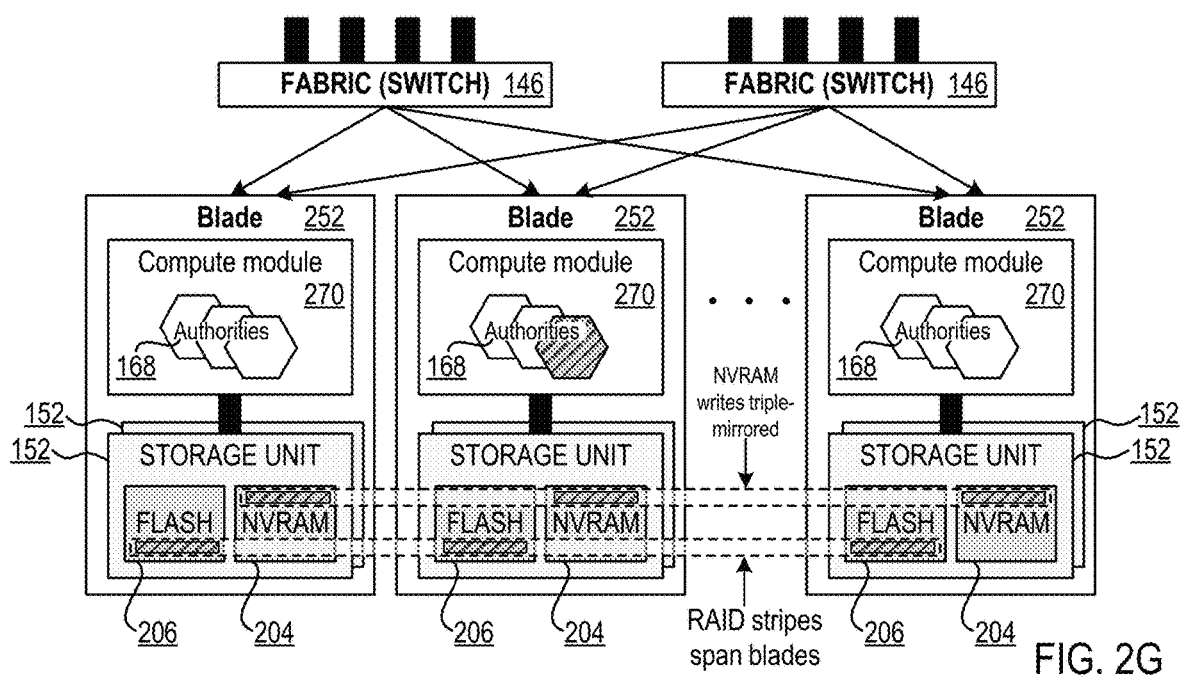
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS' environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
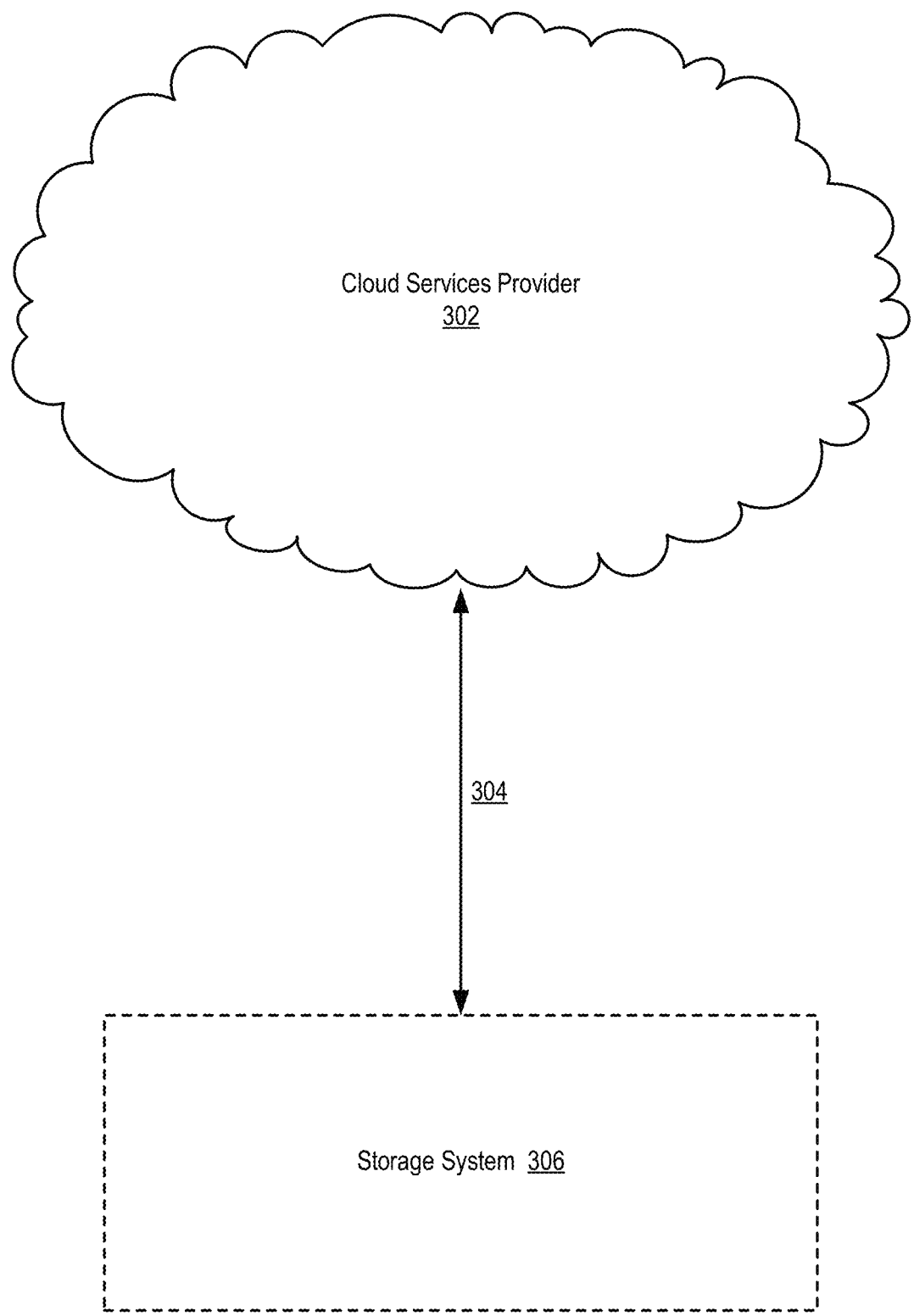
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
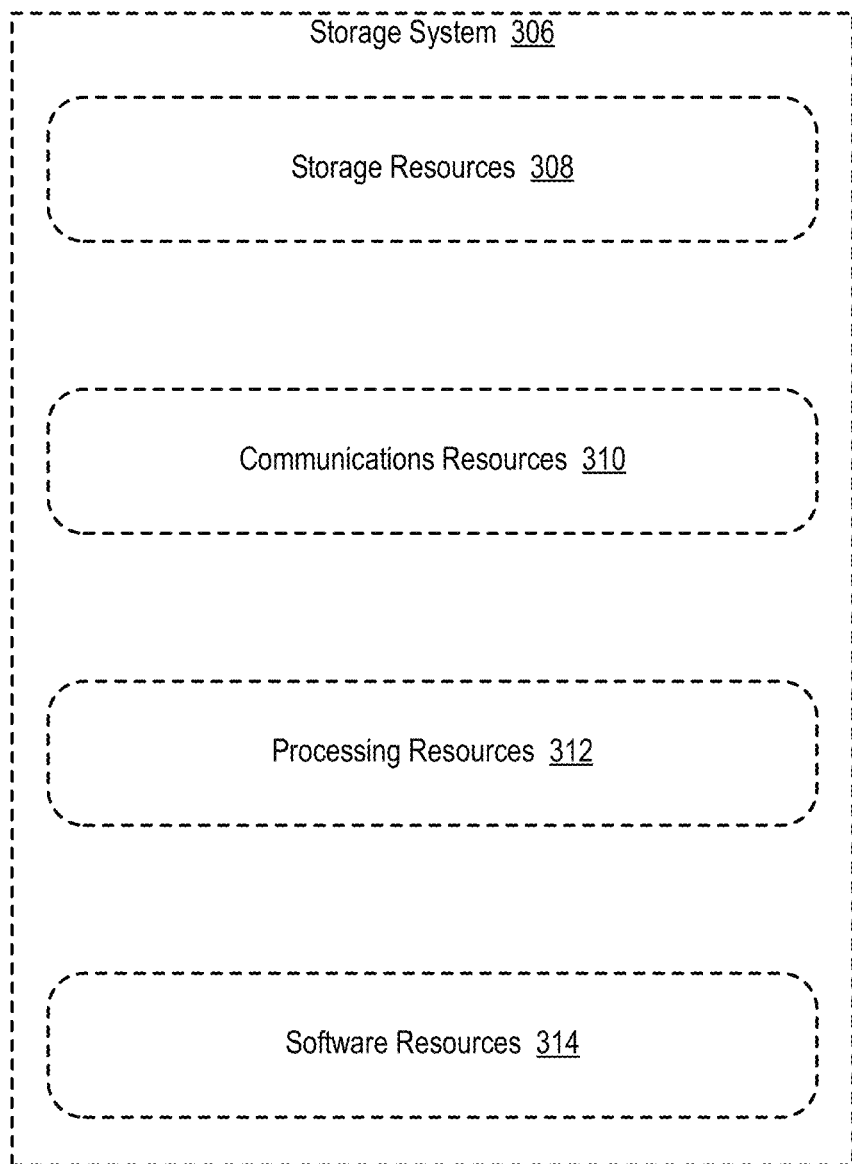
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3A may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
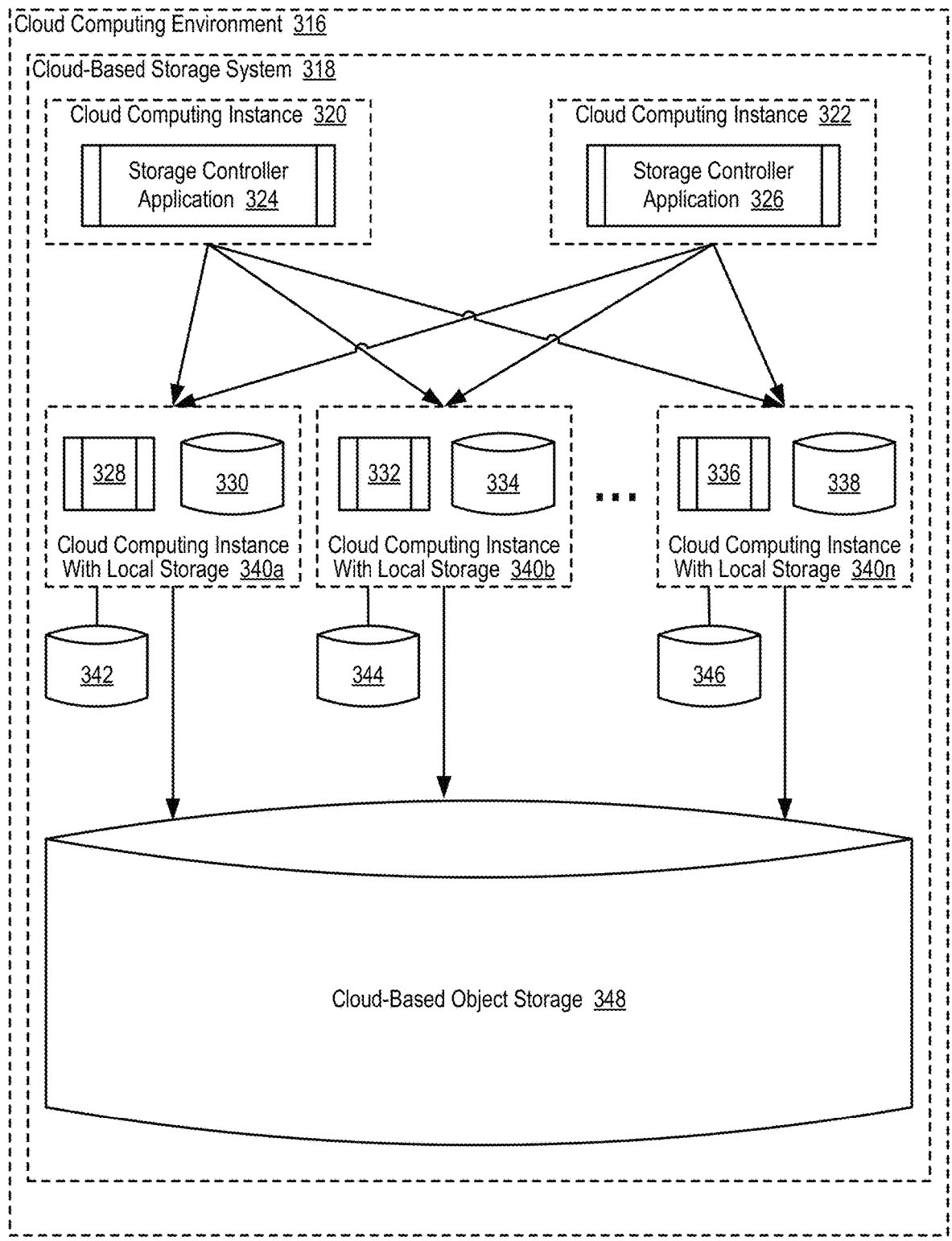
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS'), Microsoft Azure, Google Cloud Platform, IBM Cloud, Oracle Cloud, and others. The cloud-based storage system 318 may be used to provide services similar to the services that may be provided by the storage systems described above. For example, the cloud-based storage system 318 may be used to provide block storage services to users of the cloud-based storage system 318, the cloud-based storage system 318 may be used to provide storage services to users of the cloud-based storage system 318 through the use of solid-state storage, and so on.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data received from the users of the cloud-based storage system 318 to the cloud-based storage system 318, erasing data from the cloud-based storage system 318, retrieving data from the cloud-based storage system 318 and providing such data to users of the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322.

Consider an example in which the cloud computing environment 316 is embodied as AWS and the cloud computing instances are embodied as EC2 instances. In such an example, the cloud computing instance 320 that operates as the primary controller may be deployed on one of the instance types that has a relatively large amount of memory and processing power while the cloud computing instance 322 that operates as the secondary controller may be deployed on one of the instance types that has a relatively small amount of memory and processing power. In such an example, upon the occurrence of a failover event where the roles of primary and secondary are switched, a double failover may actually be carried out such that: 1) a first failover event where the cloud computing instance 322 that formerly operated as the secondary controller begins to operate as the primary controller, and 2) a third cloud computing instance (not shown) that is of an instance type that has a relatively large amount of memory and processing power is spun up with a copy of the storage controller application, where the third cloud computing instance begins operating as the primary controller while the cloud computing instance 322 that originally operated as the secondary controller begins operating as the secondary controller again. In such an example, the cloud computing instance 320 that formerly operated as the primary controller may be terminated. Readers will appreciate that in alternative embodiments, the cloud computing instance 320 that is operating as the secondary controller after the failover event may continue to operate as the secondary controller and the cloud computing instance 322 that operated as the primary controller after the occurrence of the failover event may be terminated once the primary role has been assumed by the third cloud computing instance (not shown).

Readers will appreciate that while the embodiments described above relate to embodiments where one cloud computing instance 320 operates as the primary controller and the second cloud computing instance 322 operates as the secondary controller, other embodiments are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n depicted in FIG. 3C may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 I3 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block-storage 342, 344, 346 that is offered by the cloud computing environment 316. The block-storage 342, 344, 346 that is offered by the cloud computing environment 316 may be embodied, for example, as Amazon Elastic Block Store ('EBS') volumes. For example, a first EBS volume may be coupled to a first cloud computing instance 340a, a second EBS volume may be coupled to a second cloud computing instance 340b, and a third EBS volume may be coupled to a third cloud computing instance 340n. In such an example, the block-storage 342, 344, 346 that is offered by the cloud computing environment 316 may be utilized in a manner that is similar to how the NVRAM devices described above are utilized, as the software daemon 328, 332, 336 (or some other module) that is executing within a particular cloud comping instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud comping instance 340a, 340b, 340n. In an alternative embodiment, rather than using the block-storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM.

In the example depicted in FIG. 3C, the cloud computing instances 340a, 340b, 340n with local storage 330, 334, 338 may be utilized, by cloud computing instances 320, 322 that support the execution of the storage controller application 324, 326 to service I/O operations that are directed to the cloud-based storage system 318. Consider an example in which a first cloud computing instance 320 that is executing the storage controller application 324 is operating as the primary controller. In such an example, the first cloud computing instance 320 that is executing the storage controller application 324 may receive (directly or indirectly via the secondary controller) requests to write data to the cloud-based storage system 318 from users of the cloud-based storage system 318. In such an example, the first cloud computing instance 320 that is executing the storage controller application 324 may perform various tasks such as, for example, deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances 340a, 340b, 340n with local storage 330, 334, 338. Either cloud computing instance 320, 322, in some embodiments, may receive a request to read data from the cloud-based storage system 318 and may ultimately send a request to read data to one or more of the cloud computing instances 340a, 340b, 340n with local storage 330, 334, 338.

Readers will appreciate that when a request to write data is received by a particular cloud computing instance 340a, 340b, 340n with local storage 330, 334, 338, the software daemon 328, 332, 336 or some other module of computer program instructions that is executing on the particular cloud computing instance 340a, 340b, 340n may be configured to not only write the data to its own local storage 330, 334, 338 resources and any appropriate block-storage 342, 344, 346 that are offered by the cloud computing environment 316, but the software daemon 328, 332, 336 or some other module of computer program instructions that is executing on the particular cloud computing instance 340a, 340b, 340n may also be configured to write the data to cloud-based object storage 348 that is attached to the particular cloud computing instance 340a, 340b, 340n. The cloud-based object storage 348 that is attached to the particular cloud computing instance 340a, 340b, 340n may be embodied, for example, as Amazon Simple Storage Service ('S3') storage that is accessible by the particular cloud computing instance 340a, 340b, 340n. In other embodiments, the cloud computing instances 320, 322 that each include the storage controller application 324, 326 may initiate the storage of the data in the local storage 330, 334, 338 of the cloud computing instances 340a, 340b, 340n and the cloud-based object storage 348.

Readers will appreciate that, as described above, the cloud-based storage system 318 may be used to provide block storage services to users of the cloud-based storage system 318. While the local storage 330, 334, 338 resources and the block-storage 342, 344, 346 resources that are utilized by the cloud computing instances 340a, 340b, 340n may support block-level access, the cloud-based object storage 348 that is attached to the particular cloud computing instance 340a, 340b, 340n supports only object-based access. In order to address this, the software daemon 328, 332, 336 or some other module of computer program instructions that is executing on the particular cloud computing instance 340a, 340b, 340n may be configured to take blocks of data, package those blocks into objects, and write the objects to the cloud-based object storage 348 that is attached to the particular cloud computing instance 340a, 340b, 340n.

Consider an example in which data is written to the local storage 330, 334, 338 resources and the block-storage 342, 344, 346 resources that are utilized by the cloud computing instances 340a, 340b, 340n in 1 MB blocks. In such an example, assume that a user of the cloud-based storage system 318 issues a request to write data that, after being compressed and deduplicated by the storage controller application 324, 326 results in the need to write 5 MB of data. In such an example, writing the data to the local storage 330, 334, 338 resources and the block-storage 342, 344, 346 resources that are utilized by the cloud computing instances 340a, 340b, 340n is relatively straightforward as 5 blocks that are 1 MB in size are written to the local storage 330, 334, 338 resources and the block-storage 342, 344, 346 resources that are utilized by the cloud computing instances 340a, 340b, 340n. In such an example, the software daemon 328, 332, 336 or some other module of computer program instructions that is executing on the particular cloud computing instance 340a, 340b, 340n may be configured to: 1) create a first object that includes the first 1 MB of data and write the first object to the cloud-based object storage 348, 2) create a second object that includes the second 1 MB of data and write the second object to the cloud-based object storage 348, 3) create a third object that includes the third 1 MB of data and write the third object to the cloud-based object storage 348, and so on. As such, in some embodiments, each object that is written to the cloud-based object storage 348 may be identical (or nearly identical) in size. Readers will appreciate that in such an example, metadata that is associated with the data itself may be included in each object (e.g., the first 1 MB of the object is data and the remaining portion is metadata associated with the data).

In some embodiments, all data that is stored by the cloud-based storage system 318 may be stored in both: 1) the cloud-based object storage 348, and 2) at least one of the local storage 330, 334, 338 resources or block-storage 342, 344, 346 resources that are utilized by the cloud computing instances 340a, 340b, 340n. In such embodiments, the local storage 330, 334, 338 resources and block-storage 342, 344, 346 resources that are utilized by the cloud computing instances 340a, 340b, 340n may effectively operate as cache that generally includes all data that is also stored in S3, such that all reads of data may be serviced by the cloud computing instances 340a, 340b, 340n without requiring the cloud computing instances 340a, 340b, 340n to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block-storage 342, 344, 346 resources that are utilized by the cloud computing instances 340a, 340b, 340n. In such an example, various policies may be utilized to determine which subset of the data that is stored by the cloud-based storage system 318 should reside in both: 1) the cloud-based object storage 348, and 2) at least one of the local storage 330, 334, 338 resources or block-storage 342, 344, 346 resources that are utilized by the cloud computing instances 340a, 340b, 340n.

As described above, when the cloud computing instances 340a, 340b, 340n with local storage 330, 334, 338 are embodied as EC2 instances, the cloud computing instances 340a, 340b, 340n with local storage 330, 334, 338 are only guaranteed to have a monthly uptime of 99.9% and data stored in the local instance store only persists during the lifetime of each cloud computing instance 340a, 340b, 340n with local storage 330, 334, 338. As such, one or more modules of computer program instructions that are executing within the cloud-based storage system 318 (e.g., a monitoring module that is executing on its own EC2 instance) may be designed to handle the failure of one or more of the cloud computing instances 340a, 340b, 340n with local storage 330, 334, 338. In such an example, the monitoring module may handle the failure of one or more of the cloud computing instances 340*a*, 340*b*, 340*n* with local storage 330, 334, 338 by creating one or more new cloud computing instances with local storage, retrieving data that was stored on the failed cloud computing instances 340*a*, 340*b*, 340*n* from the cloud-based object storage 348, and storing the data retrieved from the cloud-based object storage 348 in local storage on the newly created cloud computing instances. Readers will appreciate that many variants of this process may be implemented.

Consider an example in which all cloud computing instances 340*a*, 340*b*, 340*n* with local storage 330, 334, 338 failed. In such an example, the monitoring module may create new cloud computing instances with local storage, where high-bandwidth instances types are selected that allow for the maximum data transfer rates between the newly created high-bandwidth cloud computing instances with local storage and the cloud-based object storage 348. Readers will appreciate that instances types are selected that allow for the maximum data transfer rates between the new cloud computing instances and the cloud-based object storage 348 such that the new high-bandwidth cloud computing instances can be rehydrated with data from the cloud-based object storage 348 as quickly as possible. Once the new high-bandwidth cloud computing instances are rehydrated with data from the cloud-based object storage 348, less expensive lower-bandwidth cloud computing instances may be created, data may be migrated to the less expensive lower-bandwidth cloud computing instances, and the high-bandwidth cloud computing instances may be terminated.

Readers will appreciate that embodiments of the present disclosure resolve an issue with block-storage services offered by some cloud computing environments as some cloud computing environments only allow for one cloud computing instance to connect to a block-storage volume at a single time. For example, in Amazon AWS, only a single EC2 instance may be connected to an EBS volume. Through the use of EC2 instances with local storage, embodiments of the present disclosure can offer multi-connect capabilities where multiple EC2 instances can connect to another EC2 instance with local storage ('a drive instance'). In such embodiments, the drive instances may include software executing within the drive instance that allows the drive instance to support I/O directed to a particular volume from each connected EC2 instance. As such, some embodiments of the present disclosure may be embodied as multi-connect block storage services that may not include all of the components depicted in FIG. 3C.

In some embodiments, especially in embodiments where the cloud-based object storage 348 resources are embodied as Amazon S3, the cloud-based storage system 318 may include one or more modules (e.g., a module of computer program instructions executing on an EC2 instance) that are configured to ensure that when the local storage of a particular cloud computing instance is rehydrated with data from S3, the appropriate data is actually in S3. This issue arises largely because S3 implements an eventual consistency model where, when overwriting an existing object, reads of the object will eventually (but not necessarily immediately) become consistent and will eventually (but not necessarily immediately) return the overwritten version of the object. To address this issue, in some embodiments of the present disclosure, objects in S3 are never overwritten. Instead, a traditional 'overwrite' would result in the creation of the new object (that includes the updated version of the data) and the eventual deletion of the old object (that includes the previous version of the data).

In some embodiments of the present disclosure, as part of an attempt to never (or almost never) overwrite an object, when data is written to S3 the resultant object may be tagged with a sequence number. In some embodiments, these sequence numbers may be persisted elsewhere (e.g., in a database) such that at any point in time, the sequence number associated with the most up-to-date version of some piece of data can be known. In such a way, a determination can be made as to whether S3 has the most recent version of some piece of data by merely reading the sequence number associated with an object—and without actually reading the data from S3. The ability to make this determination may be particularly important when a cloud computing instance with local storage crashes, as it would be undesirable to rehydrate the local storage of a replacement cloud computing instance with out-of-date data. In fact, because the cloud-based storage system 318 does not need to access the data to verify its validity, the data can stay encrypted and access charges can be avoided.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described above may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation. Reinforcement learning may be employed to find the best possible behavior or path that a particular software application or machine should take in a specific situation. Reinforcement learning differs from other areas of machine learning (e.g., supervised learning, unsupervised learning) in that correct input/output pairs need not be presented for reinforcement learning and sub-optimal actions need not be explicitly corrected.

In addition to the resources already described, the storage systems described above may also include graphics processing units (GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may be also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains. In addition to supporting the storage and use of blockchain technologies, the storage systems described above may also support the storage and use of derivative items such as, for example, open source blockchains and related tools that are part of the IBM' Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available— including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain—computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

Figure 3D:
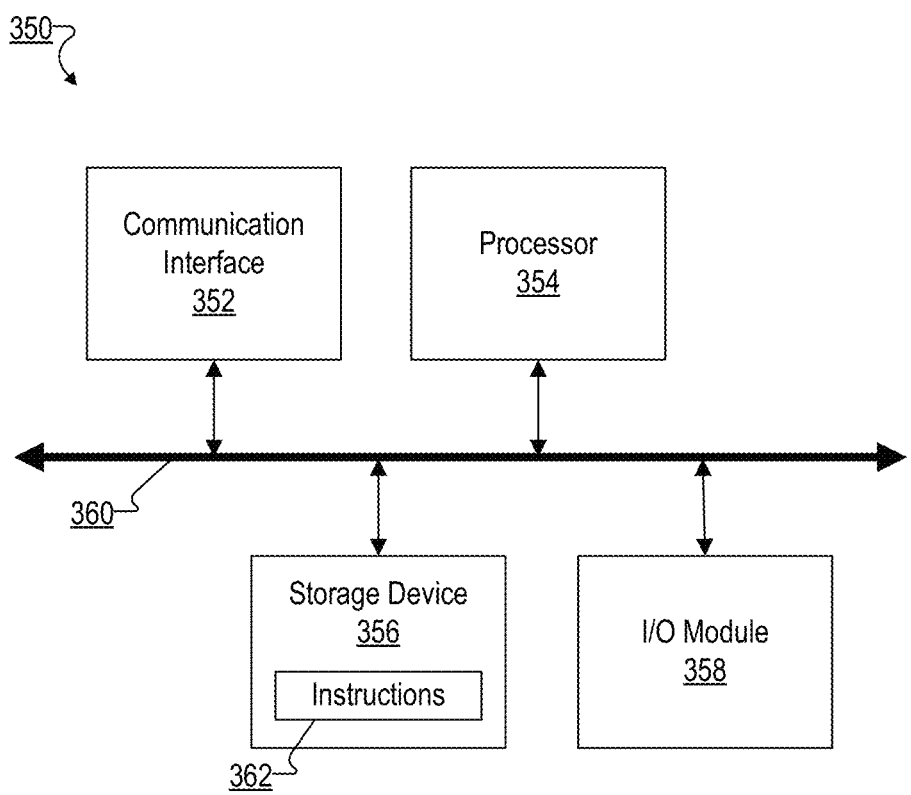
FIG. 3D illustrates an exemplary computing device that may be specifically configured to perform one or more of the processes described herein.

For further explanation, FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

Figure 4:
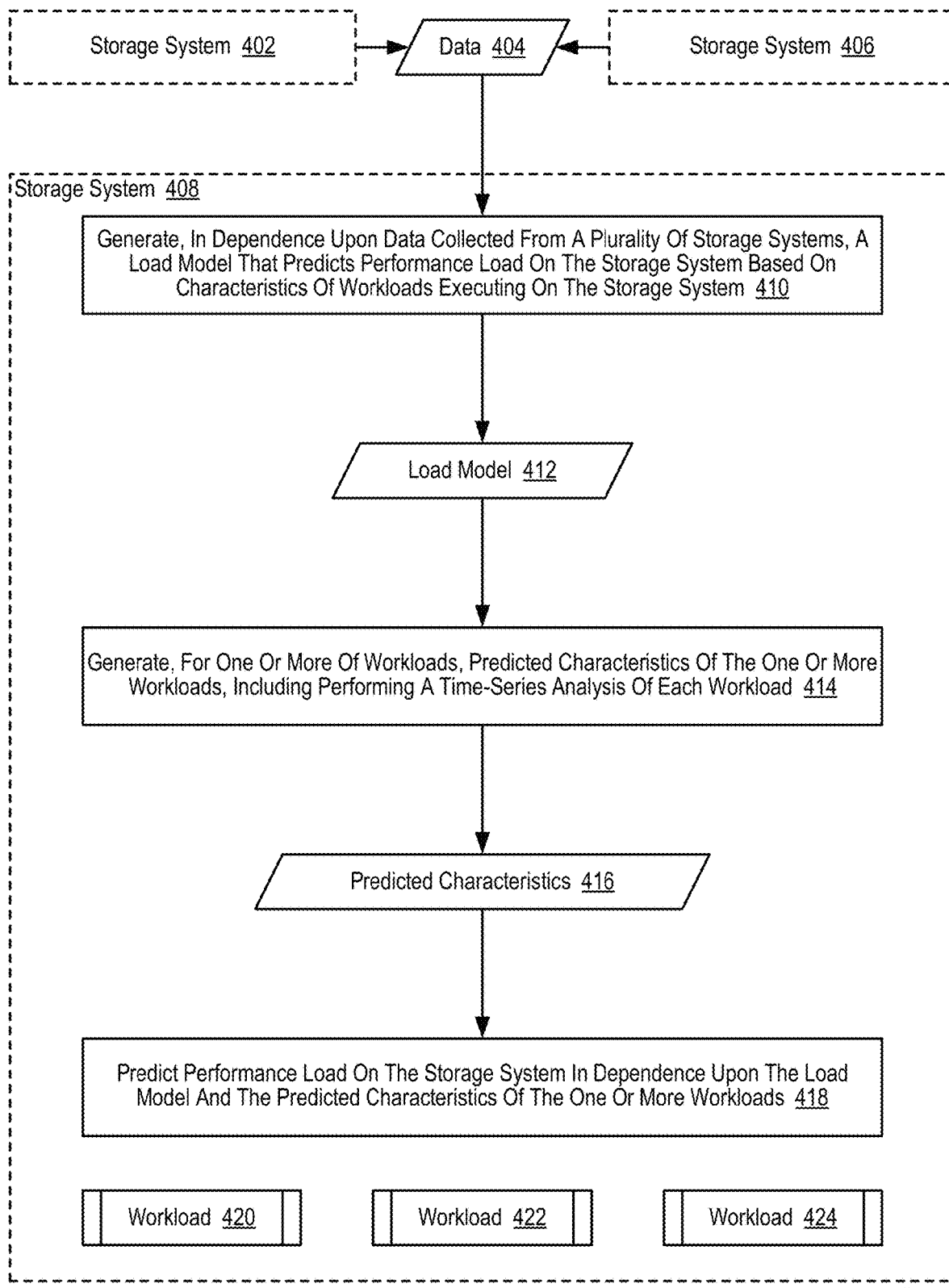
FIG. 4 sets forth a flowchart illustrating an example method of workload planning in a storage system according to some embodiments of the present disclosure.

For further explanation, FIG. 4 sets forth a flowchart illustrating an example method of workload planning in a storage system (408) according to some embodiments of the present disclosure. The storage systems (402, 406, 408) depicted in FIG. 4 may be similar to the storage systems described in the previous figures, as each storage system (402, 406, 408) may include any combination of the components as described with reference to the other figures described herein.

The example method depicted in FIG. 4 includes generating (410), in dependence upon data (404) collected from a plurality of storage systems (402, 406), a load model (412) that predicts performance load on the storage system (408) based on characteristics of workloads (420, 422, 424) executing on the storage system (408). The data (404) collected from a plurality of storage systems (402, 406) may be embodied, for example, as telemetry data that is periodically sent from the storage systems (402, 406) to a centralized management service (not illustrated). Such telemetry data may include information that is useful for monitoring the operation of the storage system that sends the data including, for example, information describing various performance characteristics of the storage system, information describing various workloads that are executing on the storage system, and other types of information. The information describing various performance characteristics of the storage system can include, for example, the number of IOPS being serviced by the storage system, the utilization rates of various computing resources (e.g., CPU utilization) within the storage system, the utilization rates of various networking resources (e.g., network bandwidth utilization) within the storage system, the utilization rates of various storage resources (e.g., NVRAM utilization) within the storage system, and many others. Likewise, the information describing various workloads that are executing on the storage system can include, for example, information describing the number of IOPS being generated by a particular workload, overwrite rates for I/O operations that are being generated by the workload, the amount of read bandwidth that is being consumed by I/O operations generated by the workload, and many others. As such, an examination of the telemetry data can reveal characteristics of the workloads (420, 422, 424) executing on the storage system (408). The characteristics of the workloads (420, 422, 424) executing on the storage system (408) can include, for example, information describing the number of IOPS being generated by the workload, overwrite rates for I/O operations that are being generated by the workload, the amount of read bandwidth that is being consumed by I/O operations generated by the workload, and many others.

In the example method depicted in FIG. 4, a load model (412) that predicts performance load on the storage system (408) based on characteristics of workloads (420, 422, 424) executing on the storage system (408) may be generated (410). The term 'performance load' used herein may refer to a measure of load on a storage system that is generated in dependence upon multiple system metrics. For example, the performance load on the storage system (408) may be generated in dependence upon the amount of read bandwidth being serviced by the storage system, the amount of write bandwidth being serviced by the storage system, the amount of IOPS being serviced by the storage system, the amount of computing load being placed on the storage system, the amount of data transfer load being placed on the storage system, and many other factors. In such an example, the performance load on the storage system (408) may be calculated according to some formula that takes as inputs the weighted or unweighted combination of such factors described in the preceding sentence. The performance load on the storage system (408) can therefore, in some embodiments, represent a single measure of load on a storage system that is generated in dependence upon multiple system metrics.

In the example method depicted in FIG. 4, generating (410) the load model (412) that predicts performance load on the storage system (408) based on characteristics of workloads (420, 422, 424) executing on the storage system (408) in dependence upon data (404) collected from a plurality of storage systems (402, 406) may be carried out, for example, through the use of machine learning techniques. In such an example, machine learning algorithms may be fed with information describing various performance characteristics of various storage systems (as extracted from the telemetry data) and information describing various workloads that are executing on various storage systems (as extracted from the telemetry data) to identify correlations between the amount of performance load that was placed on a particular storage system given the characteristics of the workloads that were executing on the particular storage system at the same point in time. In such an example, a load model (412) may be created for a variety of different storage system configurations. For example, load models may be created for storage systems that have different hardware configurations, load models may be created for storage systems that have different software configurations, load models may be created for storage systems that have different configuration settings, or any combination thereof. As such, each particular load model that is generated may be specific to a particular combination of hardware, software, configuration settings, or other attributes of a particular storage system configuration. In other embodiments, each particular load model may be to a subset of such attributes of a particular storage system configuration.

The example method depicted in FIG. 4 also includes generating (414), for one or more of workloads (420, 422, 424), predicted characteristics (416) of the one or more workloads (420, 422, 424). In the example method depicted in FIG. 4, generating (414) predicted characteristics (416) of the one or more workloads (420, 422, 424) can include performing a time-series analysis of each workload (420, 422, 424). Readers will appreciate that the telemetry data described herein may not only be useful for enabling a centralized management service to monitor the operation of the storage system that sends the data, but such telemetry data may also be useful for identifying trends associated with the workloads themselves. As such, an examination of the telemetry data can be used to generate trending information for the workloads including, for example, information describing the rate at which the number of IOPS being generated by the workload has been changing, the rate at which overwrite rates for I/O operations that are being generated by the workload are changing, the rate at which the amount of read bandwidth that is being consumed by I/O operations generated by the workload is changing, and many others. In such a way, predicted characteristics (416) of the one or more workloads (420, 422, 424) may be generated (414) by extrapolating identified trends out over a period of time in the future.

Consider an example in which telemetry data gathered from a plurality of storage systems (402, 406) indicates that, on average, the amount of CPU resources required to support a virtual desktop infrastructure workload doubles every three years. In such an example, if a particular workload (422) that is executing on the storage system (408) is a virtual desktop infrastructure workload, generating (414) predicted characteristics (416) of such a workload may be carried out, at least in part, by determining the amount of CPU resources currently required to support the particular workload (422) and assuming that the amount of CPU resources that will be required to support the particular workload (422) in the future will double every three years. In such a way, the load demands created by each workload may be projected to some point in the future.

The example method depicted in FIG. 4 also includes predicting (418) performance load on the storage system (408) in dependence upon the load model (412) and the predicted characteristics (416) of the one or more workloads (420, 422, 424). Predicting (418) performance load on the storage system (408) may be carried out, for example, by utilizing the predicted characteristics (416) of the one or more workloads (420, 422, 424) that will be supported by the storage system as inputs to the load model (412) associated with the storage system (408). In such a way, if the one or more workloads (420, 422, 424) do change over time as predicted (thereby resulting in a change to the amount of system resources that are consumed by the workloads), and the load model (412) can accurately predict how well the storage system (408) could support the workloads in their new state, the performance load on the storage system (408) can be accurately predicted.

Continuing with the example described above in which the storage system (408) is supporting a virtual desktop infrastructure workload and telemetry data gathered from a plurality of storage systems (402, 406) indicates that, on average, the amount of CPU resources required to support a virtual desktop infrastructure workload doubles every three years, assume that the load model (412) for the storage system (408) indicated that doubling the amount of CPU resources on the storage system (408) would result in a 20% increase in total performance load on the storage system (408). In such an example, absent any other changes to the storage system (408) or the workloads (420, 422, 424) supported by the storage system (408), predicting (418) performance load on the storage system (408) in dependence upon the load model (412) and the predicted characteristics (416) of the one or more workloads (420, 422, 424) would result in a prediction that the total performance load on the storage system (408) would increase by 20% in three years. This information could be used for a variety of reasons, as will be expanded upon below.

Readers will appreciate that predicting (418) performance load on the storage system (408), a load model (412) may be used that was developed for storage systems that most closely resemble the storage system (408) whose performance load is being predicted. Consider an example in which load models are constructed for systems using some combination of three system attributes: model number, system software version number, and storage capacity. In such an example, assume that the table below maps various load models with various system configurations:

TABLE 1

Model Mapping Table

| Load Model ID | System Model Num. | Software Version | Storage Capacity |
|---|---|---|---|
| 1 | 1 | Any | Any |
| 2 | 1 | 1 | Any |
| 3 | 1 | 2 | Any |
| 4 | 1 | 1 | 250-499 TB |
| 5 | 1 | 1 | 500 TB-1.5 PB |
| 6 | 1 | 2 | 250-499 TB |
| 7 | 1 | 2 | 500 TB-1.5 PB |
| 8 | 2 | Any | Any |
| 9 | 2 | 1 | Any |
| 10 | 2 | 1 | Any |

In this example, assume that the storage system (408) whose performance load is being predicted is a storage system with a model number of '1', that is running version '2' of system software, that has a storage capacity of 1 PB. In such an example, load model '5' is the load model that has been developed for storage systems that most closely resemble the storage system (408) whose performance load is being predicted would. As such, load model '5' would be utilized when predicting (418) performance load on the storage system (408) in dependence upon the load model (412) and the predicted characteristics (416) of the one or more workloads (420, 422, 424). In an example where the storage system (408) whose performance load is being predicted is a storage system with a model number of '1', that is running version '2' of system software, that has a storage capacity of 400 TB, however, load model '4' may be utilized. Readers will appreciate that in situations in which a fit that matches all criterion is not available, catch-all models (e.g., models 1, 2, 3, 8, 9, 10) may be utilized.

Figure 5:
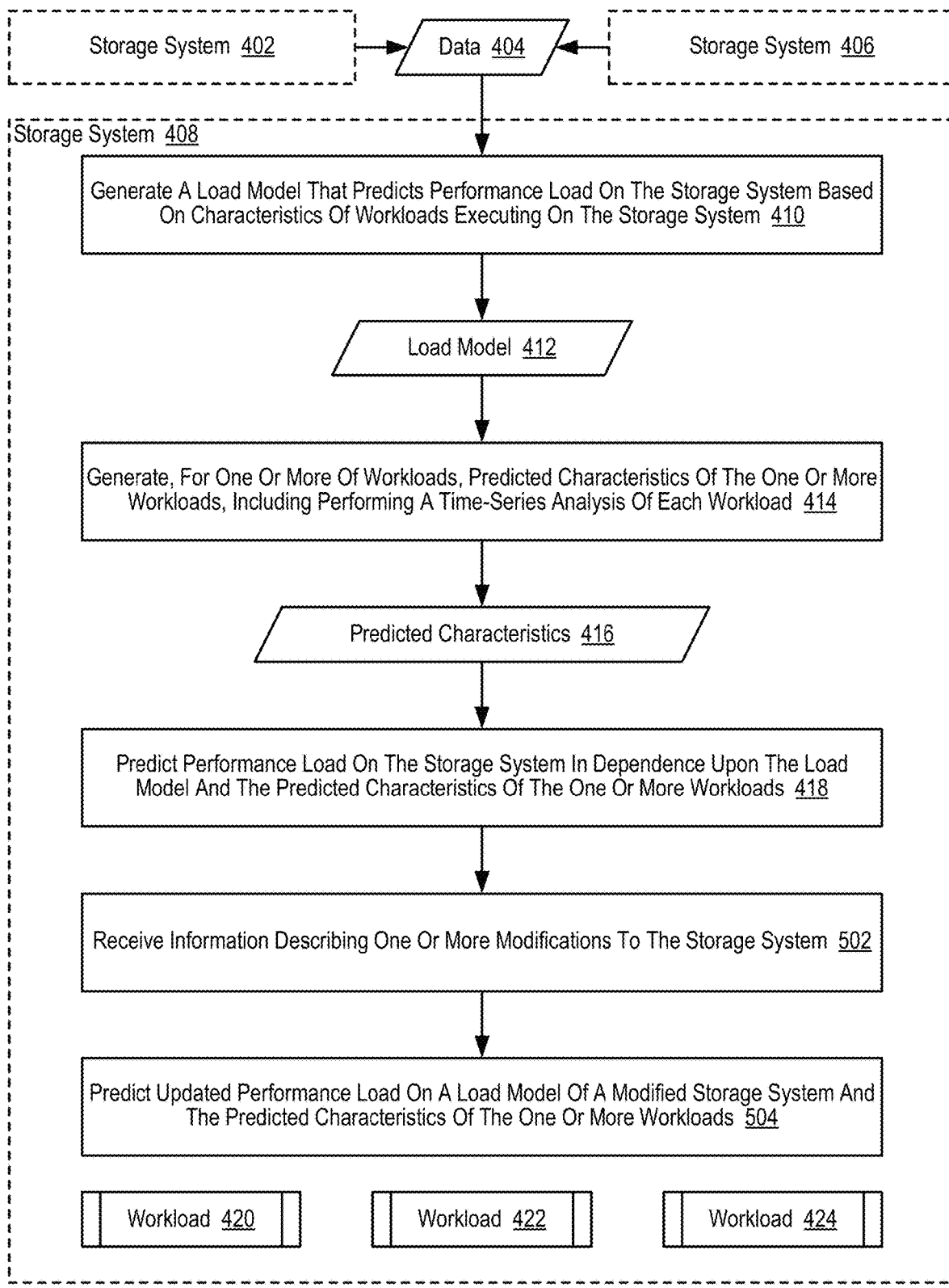
FIG. 5 sets forth a flowchart illustrating an additional example method of workload planning in a storage system according to some embodiments of the present disclosure.

For further explanation, FIG. 5 sets forth a flowchart illustrating an additional example method of workload planning in a storage system according to some embodiments of the present disclosure. The example method depicted in FIG. 5 is similar to the example methods described above, as the example method depicted in FIG. 5 also includes generating (410) a load model (412), generating (414) predicted characteristics (416) of the one or more workloads (420, 422, 424), and predicting (418) performance load on the storage system (408) in dependence upon the load model (412) and the predicted characteristics (416) of the one or more workloads (420, 422, 424).

The example method depicted in FIG. 5 also includes receiving (502) information describing one or more modifications to the storage system (408). The modifications to the storage system (408) may include, for example, upgrading from one version of system software to another version of system software, adding storage devices, removing storage devices, replacing existing storage devices in the storage system (408) with improved (e.g., denser, faster) storage devices, modifying the amount of computing resources within the storage system, modifying the type or amount of networking resources within the storage system (408), or any combination of these or other modifications. The information describing one or more modifications to the storage system (408) may be embodied, for example, as a system inventory list or in some other way. The information describing one or more modifications to the storage system (408) may be received, for example, via a user interface that enables an admin or other user to select various configuration changes.

The example method depicted in FIG. 5 also includes predicting (504) updated performance load on the storage system (408) in dependence upon a load model of a modified storage system and the predicted characteristics (416) of the one or more workloads (420, 422, 424). Predicting (504) updated performance load on the storage system (408) may be carried out, for example, by utilizing the predicted characteristics (416) of the one or more workloads (420, 422, 424) that will be supported by the storage system as inputs to a load model of associated with the storage system (408) as modified. In such a way, if the one or more workloads (420, 422, 424) do change over time as predicted (thereby resulting in a change to the amount of system resources that are consumed by the workloads), and the load model (412) can accurately predict how well the storage system (408) as modified could support the workloads in their new state, the performance load on the modified storage system (408) can be accurately predicted (504). Readers will appreciate that, as described above, a load model (412) may be used that was developed for storage systems that most closely resemble the storage system (408) as modified. As such, the load model that is used to predict (504) updated performance load on the storage system (408) may be different than the load model that was used to predict (418) performance load on the storage system (408) prior to receiving (502) information describing one or more modifications to the storage system (408).

Readers will appreciate that although the preceding paragraphs describe receiving (502) information describing one or more modifications to the storage system (408), the information may actually describe one or more possible modifications to the storage system (408)—rather than an actual modification. As such, prior to making actual modifications to the storage system (408), the impact of such modifications may be analyzed by predicting (504) updated performance load on the storage system (408) in dependence upon the predicted characteristics (416) of the one or more workloads (420, 422, 424) and a load model for storage systems that most closely resemble the storage system if the one or more possible modifications to the storage system (408) were actually made. Such information may be useful for evaluating whether to actually proceed with the modifications to the storage system (408).

Figure 6:
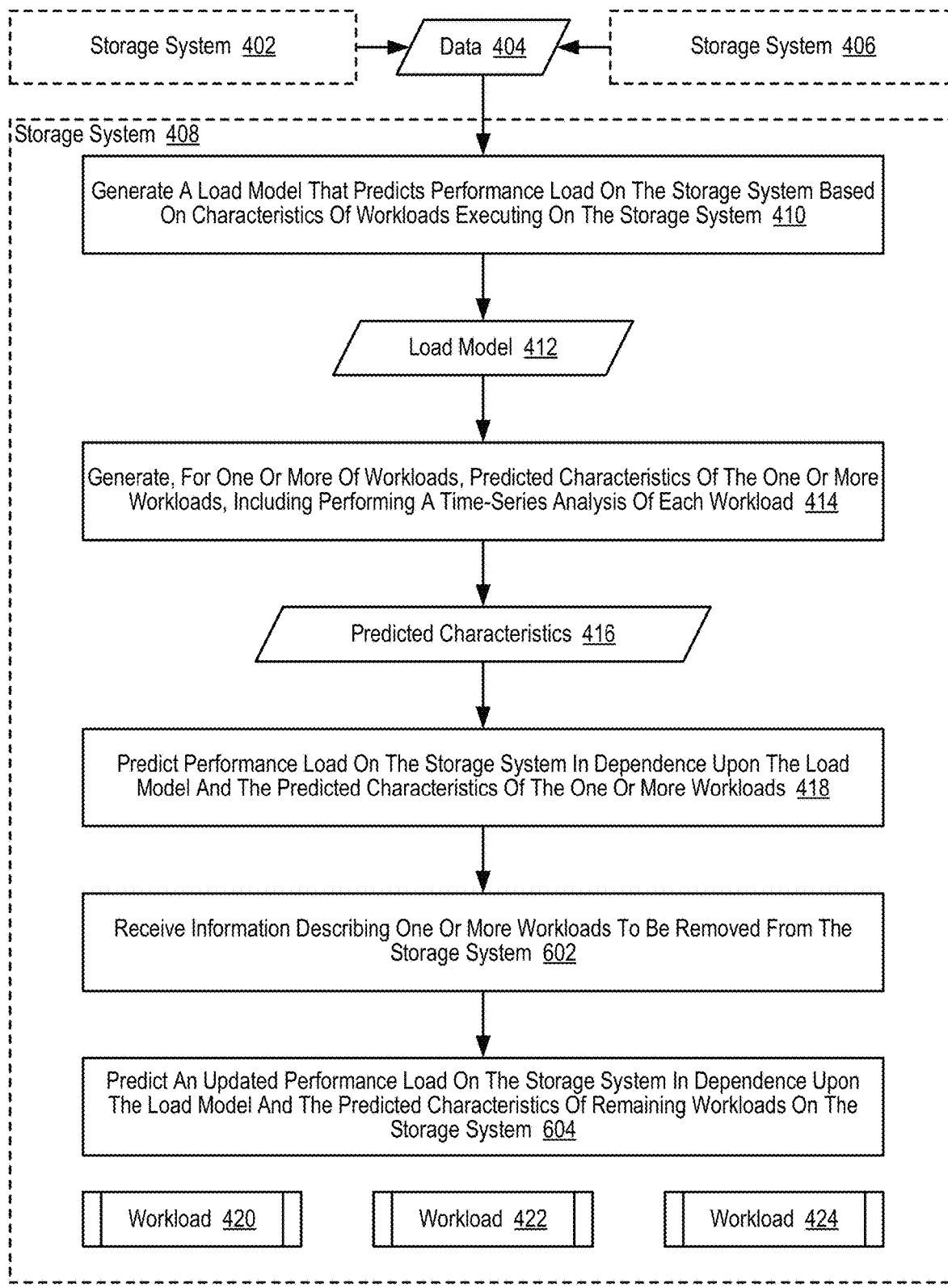
FIG. 6 sets forth a flowchart illustrating an additional example method of workload planning in a storage system according to some embodiments of the present disclosure.

For further explanation, FIG. 6 sets forth a flowchart illustrating an additional example method of workload planning in a storage system according to some embodiments of the present disclosure. The example method depicted in FIG. 6 is similar to the example methods described above, as the example method depicted in FIG. 6 also includes generating (410) a load model (412), generating (414) predicted characteristics (416) of the one or more workloads (420, 422, 424), and predicting (418) performance load on the storage system (408) in dependence upon the load model (412) and the predicted characteristics (416) of the one or more workloads (420, 422, 424).

The example method depicted in FIG. 6 also includes receiving (602) information describing one or more workloads to be removed from the storage system (408). The information describing one or more workloads to be removed from the storage system (408) may be embodied, for example, as an identifier of a particular workload that is to be removed from the storage system (408), as a generalized description (e.g., Oracle database) of a workload to be removed from the storage system (408), as an identification of a volume that is used to support a workload that is to be removed from the storage system (408), or in some other way. The information describing one or more workloads to be removed from the storage system (408) may be received, for example, via a user interface that enables an admin or other user to select workloads to be removed from the storage system (408).

The example method depicted in FIG. 6 also includes predicting (604) an updated performance load on the storage system (408) in dependence upon the load model (412) and the predicted characteristics of remaining workloads on the storage system (408). Predicting (604) an updated performance load on the storage system (408) in dependence upon the load model (412) and the predicted characteristics of remaining workloads on the storage system (408) may be carried out, for example, by utilizing the predicted characteristics (416) of the one or more remaining workloads on the storage system (408)—excluding the workload that will be removed—as inputs to the load model (412) associated with the storage system (408). In such a way, if the one or more remaining workloads (420, 422, 424) do change over time as predicted (thereby resulting in a change to the amount of system resources that are consumed by the workloads), and the load model (412) can accurately predict how well the storage system (408) could support the workloads in their new state, the performance load on the storage system (408) can be accurately predicted (418). For example, if a first workload (420) is to be removed from the storage system (408), predicting (604) an updated performance load on the storage system (408) in dependence upon the load model (412) and the predicted characteristics of remaining workloads on the storage system (408) may be carried out by utilizing the predicted characteristics (416) of the remaining workloads (422, 424) on the storage system (408) as inputs to the load model (412) associated with the storage system (408).

Readers will appreciate that although the preceding paragraphs describe receiving (602) information describing one or more workloads to be removed from the storage system (408), the information may actually describe one or more workloads that are candidates for removal from the storage system (408)—rather than workloads that have actually been removed from the storage system (408). As such, prior to actually removing a workload from the storage system (408), the impact of removing the workload from the storage system (408) may be analyzed by predicting (604) an updated performance load on the storage system (408) in dependence upon the load model (412) and the predicted characteristics of proposed remaining workloads on the storage system (408). Such information may be useful for evaluating whether to actually proceed with removing the workload from the storage system (408).

Figure 7:
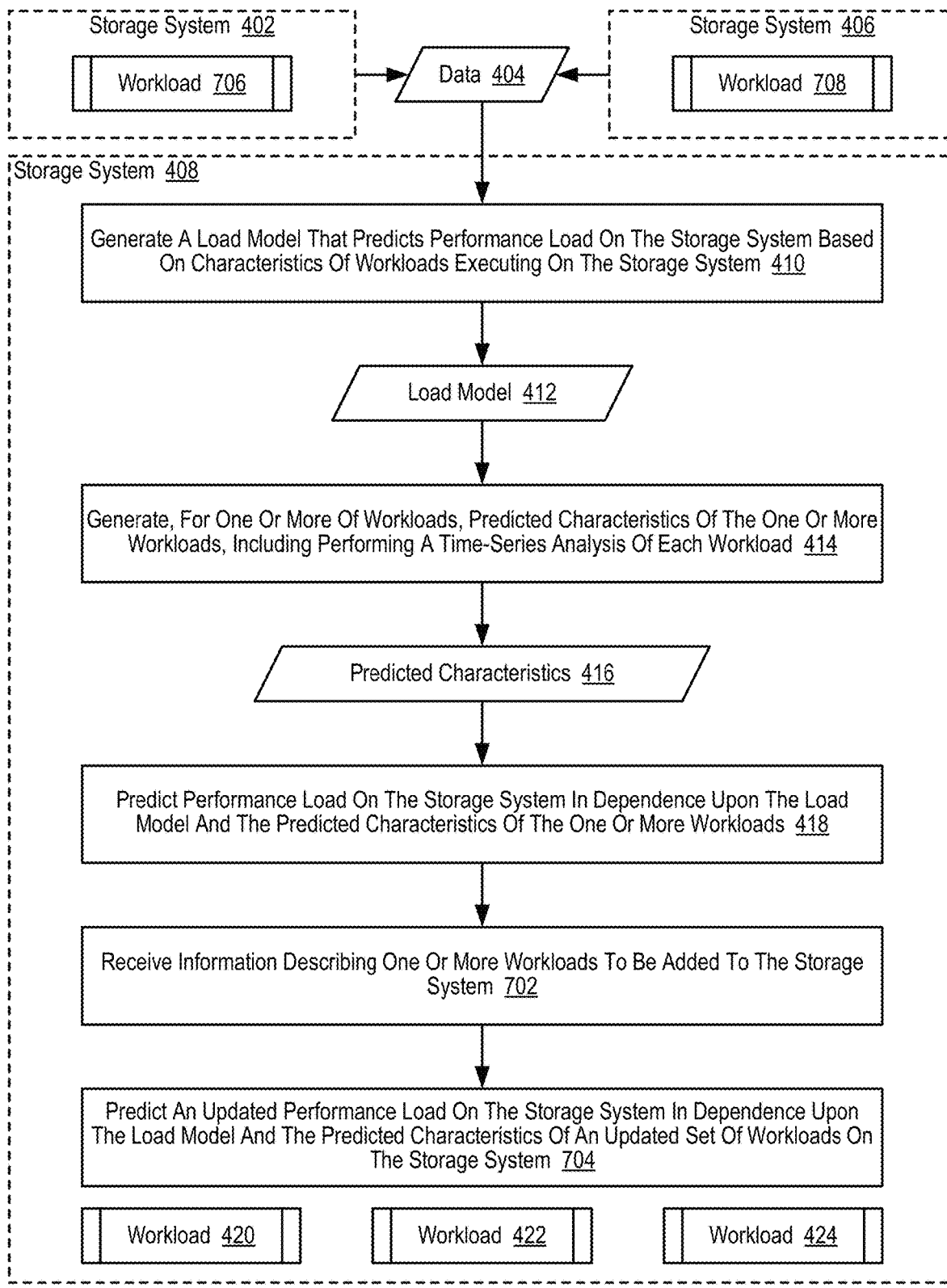
FIG. 7 sets forth a flowchart illustrating an additional example method of workload planning in a storage system according to some embodiments of the present disclosure.

For further explanation, FIG. 7 sets forth a flowchart illustrating an additional example method of workload planning in a storage system according to some embodiments of the present disclosure. The example method depicted in FIG. 7 is similar to the example methods described above, as the example method depicted in FIG. 7 also includes generating (410) a load model (412), generating (414) predicted characteristics (416) of the one or more workloads (420, 422, 424), and predicting (418) performance load on the storage system (408) in dependence upon the load model (412) and the predicted characteristics (416) of the one or more workloads (420, 422, 424).

The example method depicted in FIG. 7 also includes receiving (702) information describing one or more workloads to be added to the storage system (408). The information describing one or more workloads to be added to the storage system (408) may be embodied, for example, as an identifier of a particular workload that is executing on another storage system that may be added to the storage system (408), as a generalized description (e.g., Oracle database) of a workload to be added to the storage system (408), as an identification of a volume on another storage system that is used to support the workload that is to be added to the storage system (408), or in some other way. The information describing one or more workloads to be added to the storage system (408) may be received, for example, via a user interface that enables an admin or other user to select workloads to be added to the storage system (408).

The example method depicted in FIG. 7 also includes predicting (704) an updated performance load on the storage system (408) in dependence upon the load model (412) and the predicted characteristics of an updated set of workloads on the storage system (408). Predicting (704) an updated performance load on the storage system (408) in dependence upon the load model (412) and the predicted characteristics of an updated set of workloads on the storage system (408) may be carried out, for example, by utilizing the predicted characteristics (416) of the workloads (420, 422, 424) that were already supported by the storage system (408), as well as predicted characteristics (416) of all workloads to be added to the storage system (408), as inputs to the load model (412) associated with the storage system (408). In such a way, if the workloads (420, 422, 424) that were already supported by the storage system (408) and the workloads to be added to the storage system (408) do change over time as predicted (thereby resulting in a change to the amount of system resources that are consumed by the workloads), and the load model (412) can accurately predict how well the storage system (408) could support the workloads in their new state and the performance load on the storage system (408) can be accurately predicted (418). For example, if a workload (706) from a first storage system (402) and a workload (708) from a second storage system (406) are to be added to the storage system (408), predicting (704) an updated performance load on the storage system (408) in dependence upon the load model (412) and the predicted characteristics of an updated set of workloads on the storage system (408) may be carried out by utilizing the predicted characteristics (416) of the workloads (420, 422, 424) already supported by the storage system (408) as well as the predicted characteristics of the workloads (706, 708) to be added to the storage system (408) as inputs to the load model (412) associated with the storage system (408).

Readers will appreciate that although the preceding paragraphs describe receiving (702) information describing one or more workloads to be added to the storage system (408), the information may actually describe one or more workloads that are candidates for addition to the storage system (408)—rather than workloads that have actually added to storage system (408). As such, prior to actually adding a workload to the storage system (408), the impact of adding the workload to the storage system (408) may be analyzed by predicting (704) an updated performance load on the storage system (408) in dependence upon the load model (412) and the predicted characteristics of an updated set of workloads on the storage system (408). Such information may be useful for evaluating whether to actually proceed with adding the workloads to the storage system (408).

Readers will further appreciate that although the steps of receiving (602) information describing one or more workloads to be removed from the storage system (408) and predicting (604) an updated performance load on the storage system (408) in dependence upon the load model (412) and the predicted characteristics of remaining workloads on the storage system (408) are described with reference to the embodiment depicted in FIG. 6, while the steps of receiving (702) information describing one or more workloads to be added to the storage system (408) and predicting (704) an updated performance load on the storage system (408) in dependence upon the load model (412) and the predicted characteristics of an updated set of workloads on the storage system (408) are described with reference to the embodiment depicted in FIG. 7, embodiments of the present disclosure can include a combination of all these steps. Consider an example in which two workloads (706, 708) from other storage systems (402, 406) are candidates for addition to the storage system (408) and that, as part of adding these workloads (706, 708), workloads (420, 422) already supported by the storage system (408) would be migrated to other storage systems (402, 406). In such an example, the impact of adding workloads and removing workloads could be evaluated in combination, by passing predicted characteristics associated the updated set of workloads (424, 706, 708) that could be supported by the storage system (408) as inputs to the load model (412) associated with the storage system (408). Such embodiments may be useful for identifying an optimal set of workloads that could be placed on the storage system (408). In order to do so, it may also be necessary to generate predicted characteristics of workloads that may be added to the storage system in the same manner as described above in step 414.

Figure 8:
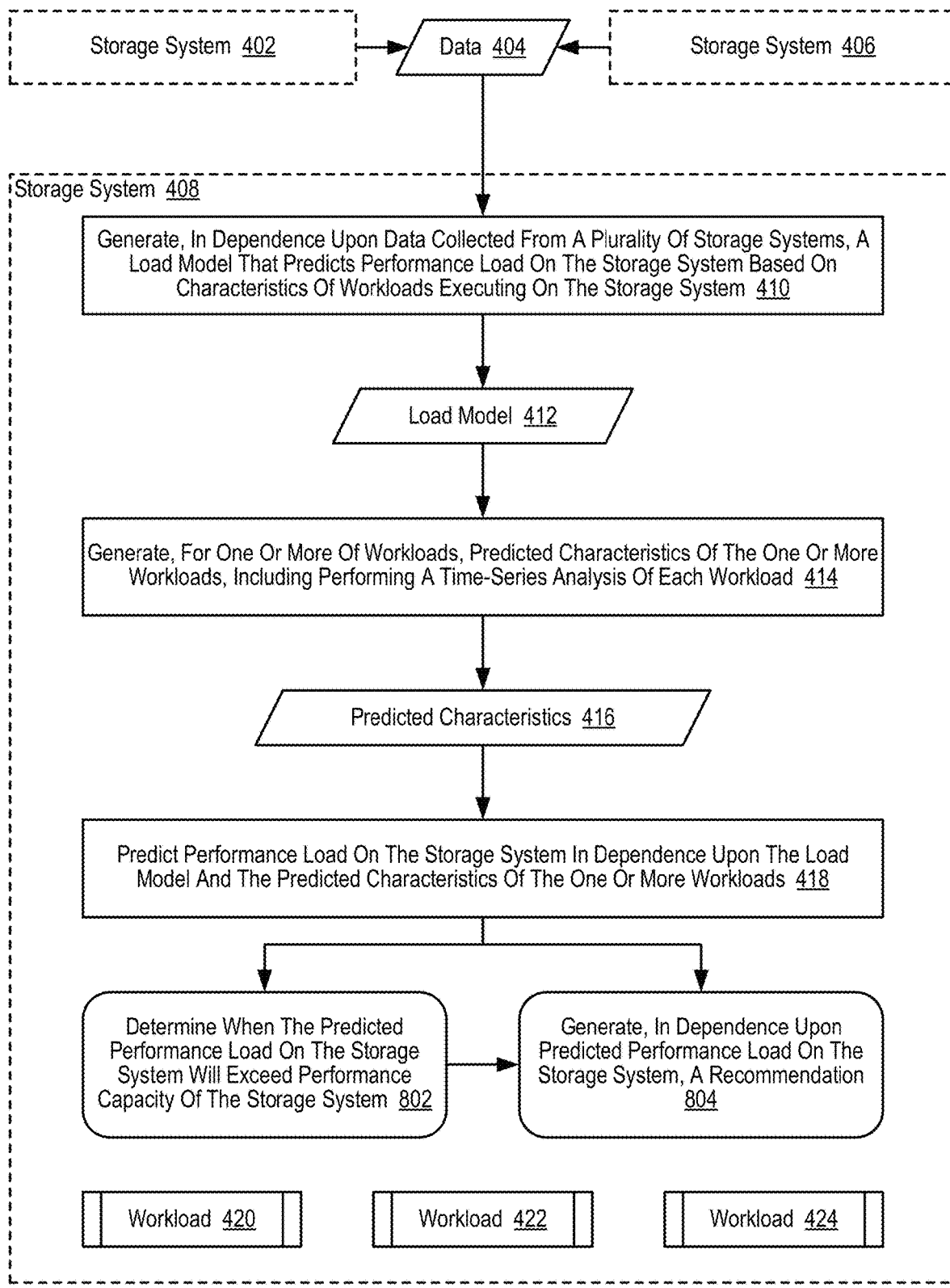
FIG. 8 sets forth a flowchart illustrating an additional example method of workload planning in a storage system according to some embodiments of the present disclosure.

For further explanation, FIG. 8 sets forth a flowchart illustrating an additional example method of workload planning in a storage system according to some embodiments of the present disclosure. The example method depicted in FIG. 8 is similar to the example methods described above, as the example method depicted in FIG. 8 also includes generating (410) a load model (412), generating (414) predicted characteristics (416) of the one or more workloads (420, 422, 424), and predicting (418) performance load on the storage system (408) in dependence upon the load model (412) and the predicted characteristics (416) of the one or more workloads (420, 422, 424).

In the example methods described herein, each of the one or more of workloads may be defined by one or more volumes on the storage system. In such an example, a workload may be defined by one or more volumes on the storage system in the sense that servicing I/O operations directed to a particular volume is a workload that a storage system must support. In such an example, because the storage system may maintain and track information such as, for example, the amount of space consumed by the volume, the amount of performance resources consumed to support the servicing of I/O operations to the volume, such information may be useful in determining the amount of load placed on the storage system as a result of servicing the workload. In many cases, a particular workload may cause I/O operations to be directed to a single volume, but in other cases a workload may cause I/O operations to be directed to multiple volumes. In either case, information associated with the volumes may be gathered (and combined if appropriate) to determine the amount load placed on the storage system as a result of servicing the workload.

The example method depicted in FIG. 8 also includes determining (802) when the predicted performance load on the storage system (408) will exceed performance capacity of the storage system (408). The performance capacity of the storage system (408) may be expressed, for example, as the number of IOPS that the storage system (408) can service, the amount of network bandwidth available within the storage system (408), the amount of read bandwidth that can be serviced by the storage system (408), the amount of write bandwidth that can be serviced by the storage system (408), the amount of various storage resources (e.g., NVRAM) within the storage system (408), and many others. In fact, the performance capacity of the storage system (408) may even be calculated as a function of a combination of such characteristics of the storage system (408) in a way that in analogous to the manner in which performance load on the storage system (408) is determined. As such, the performance capacity of the storage system (408) may be expressed in units of measure that are identical to performance load, such that the performance capacity of the storage system (408) may be expressed as a maximum performance load that can be supported by the storage system (408).

The example method depicted in FIG. 8 also includes generating (804), in dependence upon predicted performance load on the storage system (408), a recommendation. The recommendation that is generated (804) may include, for example, a recommendation to perform a hardware or software upgrade on the storage system (804), a recommendation to move a workload from the storage system (408) to another storage system, and so on. In such an example, rules may be in place such that recommendations are generated (804), for example, when the predicted performance load on the storage system (408) reaches a predetermined threshold, when the predicted performance load on the storage system (408) is expected to exceed performance capacity of the storage system (408) within a predetermined period of time, when additional storage systems are added to or removed from a cluster, when other storage systems within a cluster are modified (e.g., a hardware or software updated occurs), when the storage system (408) itself is modified, and so on. In such an example, the recommendation may be presented (e.g., via a GUI, via a message) to a system administrator or other user that can take action in response to the recommendation. Likewise, the recommendation may be sent to an upgrade module or other automated module that may carry out the recommended course of action (e.g., installing a software patch, migrating a workload).

Readers will appreciate that although the embodiments described above relate to embodiments where steps (i.e., the steps in the example methods described above) are performed by a storage system, other embodiments are within the scope of the present disclosure. In fact, the steps described above may also be carried out, for example, by a workload planning module that is outside of the storage systems. Such a workload planning module may be embodied, for example, as a module of computer program instructions executing on computer hardware within a computing device (e.g., a server) that is external to the storage systems described above. In such an embodiment, the computing device that is external to the storage systems described above may be coupled to the storage systems via one or more data communications networks, data communications links, or otherwise configured to engage in data communications directly or indirectly with the storage systems. In such an example, messages may be exchanged between the computing device that is external to the storage systems and the storage systems themselves. In an additional embodiment, the steps described above may also be carried out, for example, by a workload planning module that is embodied as a module of computer program instructions executing on computer hardware within a cloud environment. In such an embodiment, the workload planning module may be communicatively coupled to the storage systems via one or more data communications networks, data communications links, or otherwise configured to engage in data communications directly or indirectly with the storage systems. In such an example, messages may be exchanged between the workload planning module and the storage systems themselves. For completeness, FIG. 9 sets forth an embodiment in which an example method is carried out by a workload planning module (908) that is external to any of the storage systems, although the method depicted in FIG. 9 could also be carried out by one or more of the storage systems (either alone or in combination with the workload planning module).

Figure 9:
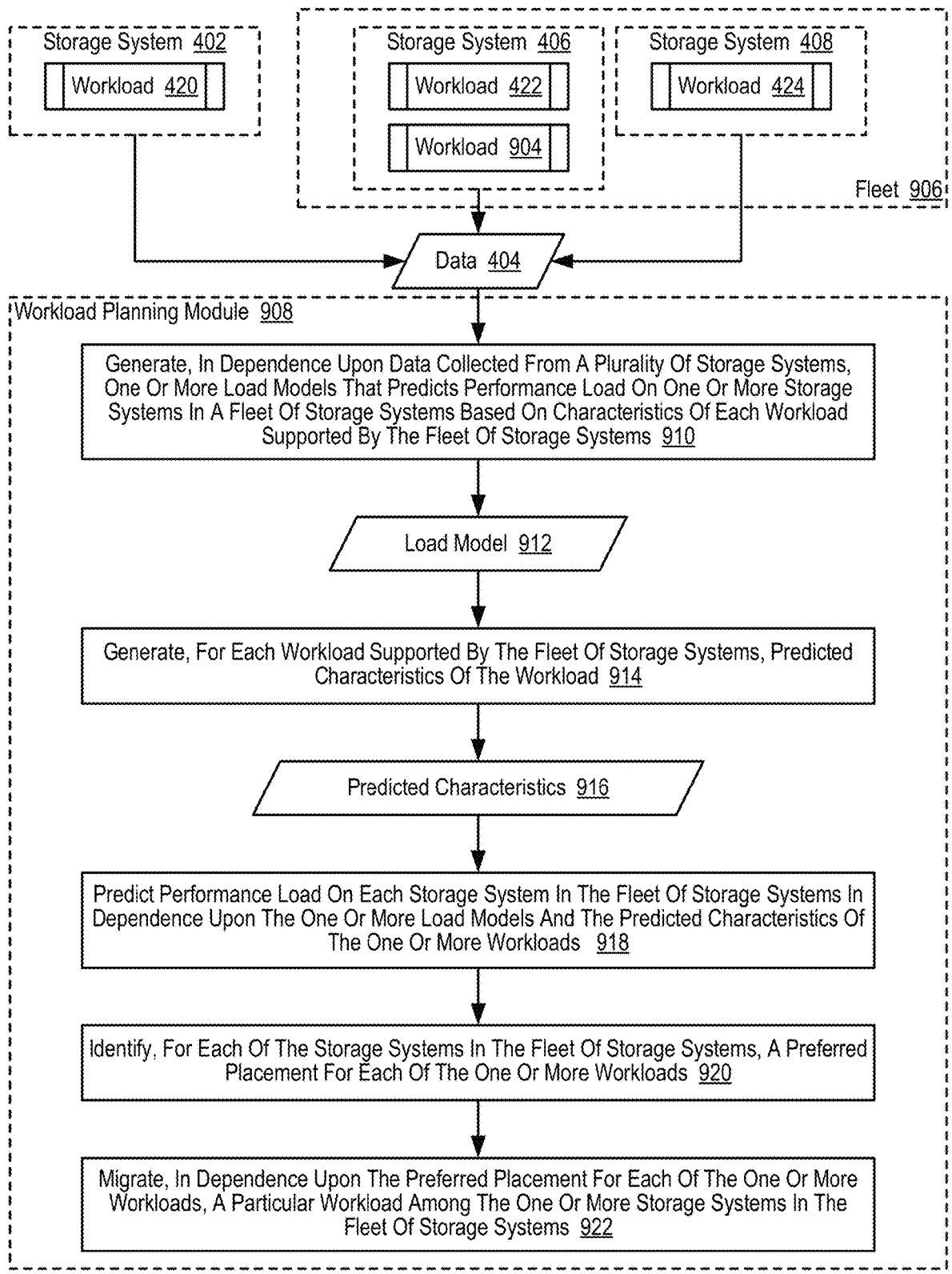
FIG. 9 sets forth a flowchart illustrating an additional example method of workload planning in a storage system according to some embodiments of the present disclosure.

For further explanation, FIG. 9 sets forth a flowchart illustrating an additional example method of workload planning in a storage system according to some embodiments of the present disclosure. The example method depicted in FIG. 9 is similar to the example methods described above, as the example method depicted in FIG. 9 also includes many of the same or related steps.

The example method depicted in FIG. 9 includes generating (910), in dependence upon data (404) collected from a plurality of storage systems (402, 406, 408), one or more load models (912) that predicts performance load on one or more storage systems (406, 408) in a fleet (906) of storage systems (406, 408) based on characteristics of each workload (422, 424, 904) supported by the fleet (906) of storage systems (406, 408). The fleet (906) of storage systems (406, 408) depicted in FIG. 9 may be embodied, for example, as a plurality of storage systems (406, 408) that belong to a single business entity, as a plurality of storage systems (406, 408) that are managed under a single management plane, and so on.

The data (404) collected from a plurality of storage systems (402, 406, 408) may be embodied, for example, as telemetry data that is periodically sent from the storage systems (402, 406, 408) to the workload planning module (908). Such telemetry data may include information that is useful for monitoring the operation of the storage system that sends the data including, for example, information describing various performance characteristics of the storage system, information describing various workloads that are executing on the storage system, and other types of information. The information describing various performance characteristics of the storage system can include, for example, the number of TOPS being serviced by the storage system, the utilization rates of various computing resources (e.g., CPU utilization) within the storage system, the utilization rates of various networking resources (e.g., network bandwidth utilization) within the storage system, the utilization rates of various storage resources (e.g., NVRAM utilization) within the storage system, and many others. Likewise, the information describing various workloads that are executing on the storage system can include, for example, information describing the number of IOPS being generated by a particular workload, overwrite rates for I/O operations that are being generated by the workload, the amount of read bandwidth that is being consumed by I/O operations generated by the workload, and many others. As such, an examination of the telemetry data can reveal characteristics of the workloads (420, 422, 424, 902, 904) supported by one or more of the storage systems (402, 406, 408). The characteristics of the workloads (420, 422, 424, 902, 904) executing on the storage systems (402, 406, 408) can include, for example, information describing the number of IOPS being generated by the workload, overwrite rates for I/O operations that are being generated by the workload, the amount of read bandwidth that is being consumed by I/O operations generated by the workload, and many others.

In the example method depicted in FIG. 9, one or more load models (912) that predict performance load on one or more storage systems (406, 408) in a fleet (906) of storage systems (406, 408) may be generated (910). The term 'performance load' used herein may refer to a measure of load on a storage system that is generated in dependence upon multiple system metrics. For example, the performance load on the storage systems (406, 408) in the fleet (906) may be generated in dependence upon the amount of read bandwidth being serviced by the storage system, the amount of write bandwidth being serviced by the storage system, the amount of IOPS being serviced by the storage system, the amount of computing load being placed on the storage system, the amount of data transfer load being placed on the storage system, and many other factors. In such an example, the performance load on the storage systems (406, 408) in the fleet (906) may be calculated according to some formula that takes as inputs the weighted or unweighted combination of such factors described in the preceding sentence. The performance load on the storage systems (406, 408) in the fleet (906) can therefore, in some embodiments, represent a single measure of load on a storage system that is generated in dependence upon multiple system metrics.

In the example method depicted in FIG. 9, generating (910), in dependence upon data (404) collected from a plurality of storage systems (402, 406, 408), one or more load models (912) that predicts performance load on one or more storage systems (406, 408) in a fleet (906) of storage systems (406, 408) based on characteristics of each workload (422, 424, 904) supported by the fleet (906) of storage systems (406, 408) may be carried out, for example, through the use of machine learning techniques. In such an example, machine learning algorithms may be fed with information describing various performance characteristics of various storage systems (as extracted from the telemetry data) and information describing various workloads that are executing on various storage systems (as extracted from the telemetry data) to identify correlations between the amount of performance load that was placed on a particular storage system given the characteristics of the workloads that were executing on the particular storage system at the same point in time. In such an example, one or more load models (412) may be created for a variety of different storage system configurations. For example, load models may be created for storage systems that have different hardware configurations, load models may be created for storage systems that have different software configurations, load models may be created for storage systems that have different configuration settings, or any combination thereof. As such, each particular load model that is generated may be specific to a particular combination of hardware, software, configuration settings, or other attributes of a particular storage system configuration. In other embodiments, each particular load model may be to a subset of such attributes of a particular storage system configuration.

The example method depicted in FIG. 9 also includes generating (914), for each workload (422, 424, 904) supported by the fleet (906) of storage systems (406, 408), predicted characteristics (916) of the workload (422, 424, 904). In the example method depicted in FIG. 4, generating (914) predicted characteristics (916) of each workload (422, 424, 904) supported by the fleet (906) of storage systems (406, 408) can include performing a time-series analysis of each workload (422, 424, 904). Readers will appreciate that the telemetry data described herein may not only be useful for enabling a centralized management service to monitor the operation of the storage system that sends the data, but such telemetry data may also be useful for identifying trends associated with the workloads themselves. As such, an examination of the telemetry data can be used to generate trending information for the workloads including, for example, information describing the rate at which the number of IOPS being generated by the workload has been changing, the rate at which overwrite rates for I/O operations that are being generated by the workload are changing, the rate at which the amount of read bandwidth that is being consumed by I/O operations generated by the workload is changing, and many others. In such a way, predicted characteristics (416) of the one or more workloads (422, 424, 904) may be generated (914) by extrapolating identified trends out over a period of time in the future.

Consider an example in which telemetry data gathered from a plurality of storage systems (402, 404, 406) indicates that, on average, the amount of CPU resources required to support a virtual desktop infrastructure workload doubles every three years. In such an example, if a particular workload (422) that is executing on one storage system (408) in the fleet (906) is a virtual desktop infrastructure workload, generating (914) predicted characteristics (416) of such a workload may be carried out, at least in part, by determining the amount of CPU resources currently required to support the particular workload (422) and assuming that the amount of CPU resources that will be required to support the particular workload (422) in the future will double every three years. In such a way, the load demands created by each workload may be projected to some point in the future.

The example method depicted in FIG. 9 also includes predicting (918) performance load on each storage system (406, 408) in the fleet (906) of storage systems (406, 408) in dependence upon the one or more load models (912) and the predicted characteristics (916) of the one or more workloads (422, 424, 904). Predicting (918) performance load on each storage system (406, 408) in the fleet (906) of storage systems (406, 408) may be carried out, for example, by utilizing the predicted characteristics (416) of the one or more workloads (422, 424, 904) that will be supported by a particular storage system as inputs to the load model (912) associated with the particular storage system. In such a way, if the one or more workloads (422, 424, 904) do change over time as predicted (thereby resulting in a change to the amount of system resources that are consumed by the workloads), and the load model (912) can accurately predict how well the particular storage system could support the workloads in their new state, the performance load on the storage system can be accurately predicted.

The example method depicted in FIG. 9 also includes identifying (920), for each storage system (406, 408) in the fleet (906) of storage systems (406, 408), a preferred placement for each of the one or more workloads (422, 424, 904).

In the example method depicted in FIG. 9, identifying (920) a preferred placement for each of the one or more workloads (422, 424, 904) may be carried out by identifying the one or more storage systems (406, 408) in the fleet (906) of storage systems (406, 408) that should be used to support a particular workload (422, 424, 904). Identifying (920) a preferred placement for each of the one or more workloads (422, 424, 904) may be carried out, for example, by predicting (918) the performance load on each storage system (406, 408) in the fleet (906) of storage systems (406, 408) for each possible permutation that workloads can be distributed across the storage systems (406, 408) in the fleet (906). In such an example, various criteria could be utilized to identify which permutation would represent a best fit. For example, in one embodiment the best fit could be identified as the permutation that resulted in the longest period of time until the predicted performance load on any of the storage systems (406, 408) will exceed performance capacity of the particular storage system. Alternatively, in another embodiment the best fit could be identified as the permutation that resulted in the largest amount of difference between: 1) the performance capacity of the storage system, and 2) the predicted performance load on the storage system at a predetermined time (e.g., in 2 months) of the fullest (in terms of performance load v. performance capacity) storage system in the fleet (906). In such a way, by identifying (920) a preferred placement for each of the one or more workloads (422, 424, 904), a fleet-level view can be taken and workloads supported by the fleet (906) of storage systems (406, 408) can be distributed in a way that is optimal for the fleet (906) as a whole.

The example method depicted in FIG. 9 includes migrating (922), in dependence upon the preferred placement for each of the one or more workloads (422, 424, 904), a particular workload (422, 424, 904) among the storage systems (406, 408) in the fleet (906) of storage systems (406, 408). In the example method depicted in FIG. 9, migrating (922) a particular workload (422, 424, 904) among the storage systems (406, 408) in the fleet (906) of storage systems (406, 408) in dependence upon the preferred placement for each of the one or more workloads (422, 424, 904) can result in a particular workload (422, 424, 904) being moved from one storage system within the fleet (906) to another storage system within the fleet (906). For example, if identifying (920) a preferred placement for a first workload (422) revealed that the preferred placement for the first workload (422) was on storage system (408), the first workload (422) could be migrated (922) from storage system (406) to storage system (408). In such an example, migrating (922) a particular workload could cause the data contained in a particular volume (or any other data that is specific to the workload being migrated) to be moved from one storage system to another storage system. Data may be moved, for example, using asynchronous or synchronous data replication techniques, by sending the data from one storage system to another storage system via a data communications path between the storage systems, or in some other way. Readers will appreciate that migrating (922) a particular workload (422, 424, 904) among the storage systems (406, 408) in the fleet (906) of storage systems (406, 408) in dependence upon the preferred placement for each of the one or more workloads (422, 424, 904) may be carried out automatically and without user intervention. For example, the state of the fleet (906) may be constantly monitored and workloads may be automatically migrated as the state of the fleet (906) changes (e.g., workloads are added, workloads are deleted, storage systems are added to the fleet, storage systems are removed from the fleet, storage systems within the fleet are modified, devices within a particular storage system fail, and so on).

Readers will appreciate that while many of the steps described above are applied to or carried out on a storage system, the same steps may be applied to or carried out on a more generalized notion of an 'environment' that includes storage resources and processing resources.

Figure 10:
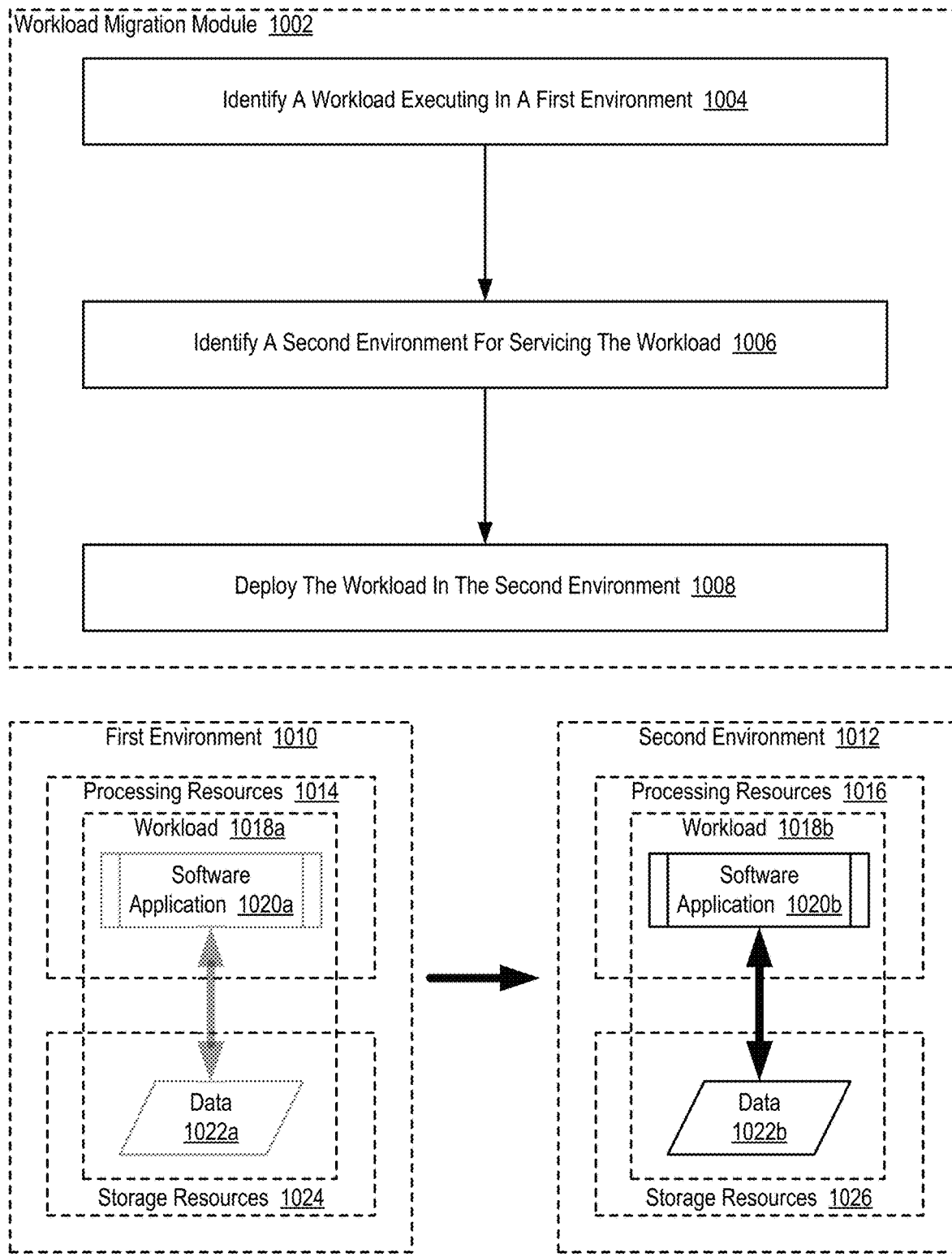
FIG. 10 sets forth a flow chart illustrating an example method of providing workload mobility between disparate execution environments in accordance with some embodiments of the present disclosure.

For further explanation, FIG. 10 sets forth a flow chart illustrating an example method of providing workload mobility between disparate execution environments (1010, 1012) in accordance with some embodiments of the present disclosure. The example method depicted in FIG. 10 is carried out by a workload migration module (1002). The workload migration module (1002) depicted in FIG. 10 may be embodied, for example, as a module of computer program instructions executing on computer hardware such as a computer processor. The workload migration module (1002) may reside in a cloud computing environment and may be included as a part of a suite of tools for monitoring and managing one or more storage systems. Alternatively, the workload migration module (1002) may reside within the storage system itself and may be executed on computer hardware within the storage system.

Consider an example in which the first environment (1010) includes a storage system (e.g., an on-premises storage system that is located within a datacenter) that is similar to the storage systems described above and the second environment (1012) includes a cloud environment (e.g., Amazon™ AWS, Microsoft™ Azure, Google™ Cloud). In an example where the workload migration module (1002) resides within the first environment (1010), the workload migration module (1002) may be embodied, for example, as a module of computer program instructions that are stored within memory contained in the storage system (e.g., memory in one of storage controllers) that are executed on computer hardware within the storage system (e.g., by one or more computer processors contained in one of the controllers). In other embodiments, the workload migration module (1002) could reside within a computing device such as a server that is in the same data center as the storage system or in many other ways. In an embodiment where the workload migration module (1002) resides within the second environment (1012), the workload migration module (1002) may be embodied, for example, as a module of computer program instructions that are deployed within an EC2 instance in Amazon's AWS. Readers will appreciate that in other embodiments, the workload migration module (1002) need not be executed in either the first environment (1010) or the second environment (1012), as the workload migration module (1002) can be supported by any computing device that is configured to communicate (directly or indirectly) with the disparate environments (1010, 1012).

The example method depicted in FIG. 10 includes identifying (1004), by the workload migration module (1002), a workload (1018a) executing in a first environment (1010). The workload migration module (1002) may identify (1004) a workload (1018a) executing in a first environment (1010), for example, through the use of a user interface that enables a user to select a particular workload (1018a) that is to be migrated from a first environment (1010) to a second environment (1012). The workload migration module (1002) may alternatively identify (1004) a workload (1018a) executing in a first environment (1010), for example, through the use of an automated monitoring module that identifies environments that are over-subscribed and identifies workloads that may be candidates for migration to reduce the load on a particular environment (1010), through the use of an automated monitoring module that identifies workloads that may benefit from being migrated to a different environment, and in other ways.

In the example method depicted in FIG. 10, the workload (1018*a*) includes a software application (1020*a*) that is being executed and data (1022*a*) that is accessed by the software application (1020*a*). In the example depicted in FIG. 10, the software application (1020*a*) is depicted as being executed by processing resources (1014) within the first environment (1010). The nature of the processing resources (1014) may be highly dependent upon what type of environment the first environment (1010) is embodied as. For example, if the first environment (1010) includes a storage system, the processing resources (1014) may be embodied as a container that is running on computer hardware within the storage system, as a virtual machine that is running on computer hardware within the storage system, and so on. If the first environment (1010) includes a cloud computing environment, however, the processing resources (1014) may be embodied as an Amazon EC2 instance, as a Microsoft Azure Function, or in some other manner.

In the example method depicted in FIG. 10, the data (1022*a*) that is being accessed by the software application (1020*a*) is depicted as being supported by storage resources (1024) that are included in the first environment (1010). The nature of the storage resources (1024) may be highly dependent upon what type of environment the first environment (1010) is embodied as. For example, if the first environment (1010) includes a storage system, the storage resources (1024) may be embodied as one or more storage devices that are included within the storage system. If the first environment (1010) includes a cloud computing environment, however, the storage resources (1024) may be embodied as Amazon S3 storage, Amazon EBS storage, Amazon EFS storage, Azure Blob Storage, or in some other manner. Readers will appreciate that, as described above, the first environment (1010) can include both processing resources (1014) for supporting the execution of the software application (1020*a*) that is being executed as well as storage resources (1024) for storing the data (1022*a*) that is accessed by the software application (1020*a*).

The example method depicted in FIG. 10 also includes identifying (1006), by a workload migration module (1002), a second environment (1012) for servicing the workload (1018*a*). The workload migration module (1002) may identify (1006) a second environment (1012) for servicing the workload (1018*a*), for example, through the use of a user interface that enables a user to select a particular workload (1018*a*) that is to be migrated from a first environment (1010) to a second environment (1012). The workload migration module (1002) may alternatively identify (1006) a second environment (1012) for servicing the workload (1018*a*), for example, through the use of an automated monitoring module that identifies environments that are over-subscribed and identifies workloads that may be candidates for migration to reduce the load on a particular environment (1010), through the use of an automated monitoring module that identifies workloads that may benefit from being migrated to a different environment, and in other ways.

The example method depicted in FIG. 10 also includes deploying (1008), by a workload migration module (1002), the workload (1018*b*) in the second environment (1012). The workload migration module (1002) may deploy (1008) the workload (1018*b*) in the second environment (1012), for example, by migrating data (1022*a*) stored on storage resources (1024) in the first environment (1010) to storage resources (1026) in the second environment (1012), thereby creating a new instance of the data (1022*b*) in the second environment (1012). The workload migration module (1002) may also deploy (1008) the workload (1018*b*) in the second environment (1012), for example, by launching a new instance of the software application (1020*b*) on processing resources (1016) within the second environment (1012), thereby effectively creating a new instance of the workload (1018*b*) on the second environment (1012).

Readers will appreciate that the first environment (1010) and the second environment (1012) may be different types of environments, where each environment (1010, 1012) is being characterized as being of a different type because at least one of the processing resources or storage resources within a particular environment are different. For example, the first environment (1010) may be embodied such that the processing resources are in the form of a virtual machine that is supported by computer hardware within a storage system and the second environment (1012) is embodied such that the processing resources are in the form of a container that is supported by computer hardware within a storage system. In such an example, the processing resources for each environment (1010, 1012) may be identical (e.g., as one or more storage devices in the storage system), such that deploying (1008) the workload (1018*b*) in the second environment (1012) may be carried out, for example, by creating a Docker™ image that includes the source code for the software application (1020*b*) and by running a Docker container that is created from the image that includes the source code for the software application (1020*b*). In such an example, the created container can be mounted to the one or more volumes within the storage system that contain the data that is accessed by the software application (1020*b*), as in this particular example the first environment (1010) and the second environment (1012) include the same storage resources but have different types of processing resources.

In other examples, both the processing resources and the storage resources associated with each environment (1010, 1012) may be different. For example, the first environment (1010) may be embodied such that the processing resources (1014) are in the form of a virtual machine that is supported by computer hardware within a storage system and the storage resources (1024) are in the form of one or more storage devices included within the storage system. In such an example, the second environment (1012) may be embodied such that the processing resources (1016) are embodied as an Amazon Elastic Container Service instance in AWS and the storage resources (1026) are embodied as Amazon S3 storage in AWS. In such an example, deploying (1008) the workload (1018*b*) in the second environment (1012) may be carried out by not only creating a containerized version of the software application as described above, but also may require migrating the data (1022*a*) from the storage resources (1024) in the first environment (1010) to the storage resources (1026) in the second environment (1012). In such an example, the created container can be mounted to the storage resources (1026) in the second environment (1012), thereby enabling the software application (1020*b*) that is executing in the second environment (1012) to access the data (1022*b*) that is stored in the second environment (1012). In each example, the software application is being executed in a first type of execution environment and deploying the workload in the second environment includes executing the software application in a second type of execution environment, wherein the first type of execution environment is different than the second type of execution environment.

Figure 11:
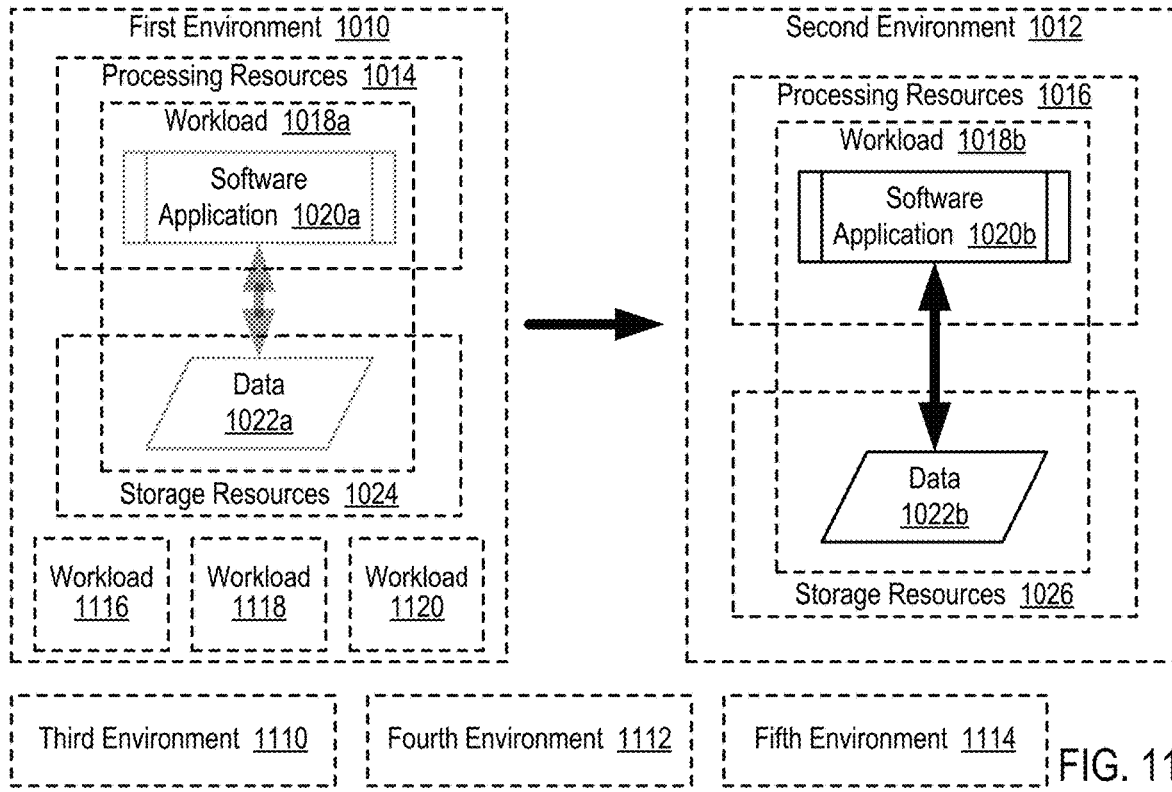
FIG. 11 sets forth a flow chart illustrating an additional example method of providing workload mobility between disparate execution environments in accordance with some embodiments of the present disclosure.

For further explanation, FIG. 11 sets forth a flow chart illustrating an additional example method of providing workload mobility between disparate execution environments (1010, 1012) in accordance with some embodiments of the present disclosure. The example method depicted in FIG. 11 is similar to the example method depicted in FIG. 10, as the example method depicted in FIG. 11 also includes a workload migration module (1002) identifying (1004) a workload (1018a) executing in a first environment (1010), identifying (1006) a second environment (1012) for servicing the workload (1018a), and deploying (1008) the workload (1018b) in the second environment (1012).

In the example method depicted in FIG. 11, identifying (1004) a workload (1018a) executing in a first environment (1010) can include identifying (1102), from amongst a plurality of workloads (1018a, 1116, 1118, 1120), a preferred workload (1018a) to migrate. Identifying (1102) a preferred workload (1018a) to migrate from amongst a plurality of workloads (1018a, 1116, 1118, 1120) may be carried out, for example, by applying many of the techniques described above to predict the performance load on each environment (1010, 1012) that would result from moving each of the candidate workloads (1018a, 1116, 1118, 1120) from the first environment (1010) to the second environment (1012). In such an example, predicting the performance load on each environment (1010, 1012) that would result from moving each of the candidate workloads (1018a, 1116, 1118, 1120) from the first environment (1010) to the second environment (1012) could be carried out, as described in greater detail above, in dependence upon load model for each environment (1010, 1012) and in dependence upon the predicted characteristics of the one or more workloads candidate workloads (1018a, 1116, 1118, 1120). In such a way, a best fit type analysis could be performed to identify which workload (1018a, 1116, 1118, 1120) should be migrated.

Consider an example in which processing resources (1014) in the first environment (1010) were highly constrained but storage resources (1024) within the first environment (1010) were not constrained. In such an example, the characteristics of each workload (1018a, 1116, 1118, 1120) the predicted characteristics of the one or more workloads candidate workloads (1018a, 1116, 1118, 1120) may be examined to identify the best candidate for migration. For example, if one workload (1018a) require (or are predicted to require) relatively large amounts of processing resources while other workloads (1116, 1118, 1120) require (or are predicted to require) very small amounts of processing resources, the processing-intensive workload (1018a) may be identified as the best workload to migrate, as such a migration may have the largest impact in reducing the burden placed on the highly constrained processing resources (1014). Readers will appreciate that prior to actually migrating the workload (1018a), similar analysis may be performed to examine the impact of such a migration on the second environment (1012), to ensure that the second environment (1012) can adequately support the workload (1018a) prior to actually deploying the workload (1018b) on the second environment (1012).

In the example method depicted in FIG. 11, identifying (1006) a second environment (1012) for servicing the workload (1018a) can include identifying (1104), from amongst a plurality of environments (1012, 1110, 1112, 1114), a preferred environment (1012) for the workload (1018a). Identifying (1104) a preferred environment (1012) for the workload (1018a) from amongst a plurality of environments (1012, 1110, 1112, 1114) may be carried out, for example, by applying many of the techniques described above to predict the performance load on each environment (1012, 1110, 1112, 1114) that would result from moving the workload (1018a) from the first environment (1010) to each of the candidate environments (1012, 1110, 1112, 1114). In such an example, predicting the performance load on each of the candidate environments (1012, 1110, 1112, 1114) that would result from moving the workload (1018a) from the first environment (1010) to the each of the candidate environments (1012, 1110, 1112, 1114) could be carried out, as described in greater detail above, in dependence upon load model for each of the candidate environments (1012, 1110, 1112, 1114) and in dependence upon the predicted characteristics of the workload (1018a). In such a way, a best fit type analysis could be performed to identify which of the candidate environments (1012, 1110, 1112, 1114) should be used to support the workload (1018a).

Consider an example in which processing resources (1016) in the second environment (1012) were highly available but processing resources in the other candidate environments (1110, 1112, 1114) were being heavily used and were highly constrained. In such an example, further assume that the predicted characteristics of the workload (1018a) indicated that the workload (1018a) required (or was predicted to require) relatively large amounts of processing resources. In such an example, predicting the performance load on each environment (1012, 1110, 1112, 1114) that would result from moving the workload (1018a) from the first environment (1010) to each of the candidate environments (1012, 1110, 1112, 1114) may reveal that the second environment (1012) could adequately support the workload (1018a) but that workload performance would suffer if the workload (1018a) was migrated to any of the other candidate environments (1110, 1112, 1114) due to the unavailability of sufficient processing resources. Readers will appreciate that prior to actually migrating the workload (1018a), this analysis may be performed to identify (1104) a preferred environment (1012) for the workload (1018a) from amongst a plurality of environments (1012, 1110, 1112, 1114).

In the example method depicted in FIG. 11, deploying (1008) the workload (1018b) in the second environment (1012) can include creating (1106) an instance of the software application on a different execution environment than was used by the first environment (1010). Consider an example in which the software application was executing on a virtual machine in the first environment (1010). In such an example, creating (1106) an instance of the software application on a different execution environment than was used by the first environment (1010) may be carried out, for example, by creating an instance of the software application that is executed in a container, by creating an instance of the software application that is supported by different processing resources (e.g., in a cloud versus in an on-premises machine), and so on.

In the example method depicted in FIG. 11, deploying (1008) the workload (1018b) in the second environment (1012) can also include migrating (1108) the data that is accessed by the software application from a first storage environment to a second storage environment. Migrating (1108) the data that is accessed by the software application from a first storage environment to a second storage environment may be carried, for example, by replicating the data from a first storage system to second storage system, by replicating the data from an on-premises storage system to cloud-based storage, by replicating the data from cloud-based storage to an on-premises storage system, and in other ways.

Figure 12:
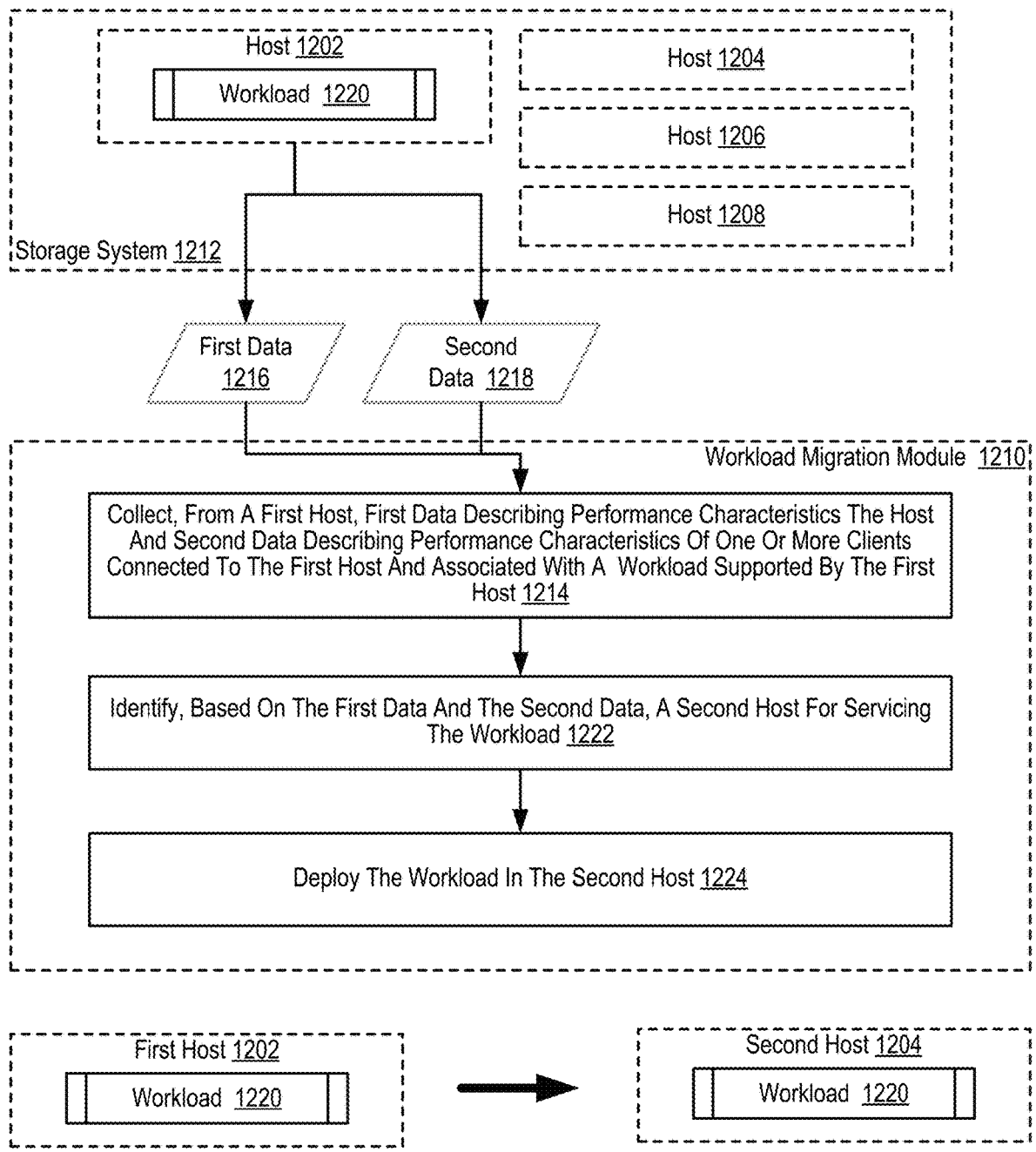
FIG. 12 sets forth a flow chart illustrating an additional example method of providing application-aware analytics for storage systems in accordance with some embodiments of the present disclosure.

For further explanation, FIG. 12 sets forth a flow chart illustrating an example method of providing application-aware analytics for storage systems (1202, 1204, 1206, 1208) in accordance with some embodiments of the present disclosure. The example method depicted in FIG. 12 is carried out by a workload migration module (1210). The workload migration module (1210) depicted in FIG. 12 may be embodied, for example, as a module of computer program instructions executing on computer hardware such as a computer processor. The workload migration module (1210) may reside in a cloud computing environment and may be included as a part of a suite of tools for monitoring and managing one or more storage systems (1212). Alternatively, the workload migration module (1210) may reside within the storage system (1212) itself and may be executed on computer hardware within the storage system (1212).

The example method depicted in FIG. 12 includes collecting (1214), by a workload migration module (1210), from a first host (1202), first data (1216) describing performance characteristics of the first host (1202) and second data (1218) describing performance characteristics of one or more clients connected to the first host (1202) and associated with a workload (1220) supported by the first host (1202). The first data (1216) and second data (1218) may be embodied, for example, as telemetry data that is periodically sent from the first host (1202) to the workload planning module (1210). Such first data (1216) may include information that is useful for monitoring the operation of the first host (1202) including, for example, information describing various performance characteristics of the first host (1202), information describing various workloads (e.g., the workload (1220)) that are executing on the first host (1202), and other types of information. The information describing various performance characteristics of the first host (1202) can include, for example, the number of IOPS being serviced by the first host (1202), the utilization rates of various computing resources (e.g., CPU utilization) within the first host (1202), the utilization rates of various networking resources (e.g., network bandwidth utilization) within the first host (1202), the utilization rates of various storage resources (e.g., NVRAM utilization) within the first host (1202), and many others. Likewise, the information describing various workloads that are executing on the first host (1202) can include, for example, information describing the number of TOPS being generated by a particular workload, overwrite rates for I/O operations that are being generated by the workload, the amount of read bandwidth that is being consumed by I/O operations generated by the workload, and many others. The second data (1218) may include information that is useful for monitoring the operation of the one or more clients in relation to the workload (1220), including an amount of processing or storage resources of the respective clients used by an application connecting to the first host (1202), network adapter usage rates, network adapter buffer usage or saturation rates, or other attributes. The first host (1202) may collect the second data (1218) from the one or more clients via a host agent executed on the first host (1202) connected to the one or more clients. The first host (1202) may then send the aggregated second data (1218) to the workload migration module (1210).

The method of FIG. 12 also includes identifying (1222), based on the first data (1216) and the second data (1218), a second host (1204) for servicing the workload (1220). For example, the workload migration module (1002) may identify the second host (1204) in response to one or more metrics in the first data (1216) or second data (1218) exceeding or falling below a threshold. For example, the first data (1216) may indicate that an amount of processing resources or storage resources of the first host (1202) is exceeding a threshold. As another example, the first data (1216) may indicate that a number of serviced requests or IOPS has fallen below a threshold. As a further example, the second data (1218) may indicate that a client's CPU usage or memory usage exceeds a threshold. The second host (1204) may also be identified in response to a predicted performance characteristic (e.g., a time-series projection of a performance characteristic) exceeding or falling below a threshold (e.g., within a predefined time window). Accordingly, the second host (1204) may be identified as a host (1202, 1204, 1206, 1208) more suitable for supporting the workload (1220) compared to the first host (1202).

The example method depicted in FIG. 12 also includes deploying (1224), by a workload migration module (1210), the workload (1220) in the second host (1204). The workload migration module (1210) may deploy (1224) the workload (1220) in the second host (1204), for example, by migrating data stored on storage resources in the first host (1202) to storage resources in the second host (1204), thereby creating a new instance of the data in the second host (1204). The data accessed by the workload (1220) may also be stored in storage resources of the storage system (1212) remote to or otherwise accessible to both the first host (1202) and second host (1204). Accordingly, instances of such data need not be created in the second host (1204). The workload migration module (1210) may also deploy (1224) the workload (1220) in the second host (1204), for example, by launching a new instance of a software application of the workload (1220) in the second host (1204). The workload migration module (1210) may also deploy (1224) the workload (1220) in the second host (1204), for example, by disconnecting one or more clients connected to the workload (1220) in the first host (1202) and connecting them to the second host (1204).

Readers will appreciate that the approach set forth above allows for workloads (1220) to be migrated between hosts using performance metrics related to the host (1202) currently supporting the workload (1220) (e.g., the first data (1216)) as well as client-side performance metrics (e.g., the second data (1218)). Furthermore, readers will appreciate the approach set forth above allows for time-series predictions based on the first data (1216) and second data (1218) to be used in determining optimal workload (1220) deployment. Readers will further appreciate that, though the first host (1202) and the second host (1204) are shown as components of a same storage system (1212), it is understood that the first host (1202) and second host (1204) may be within different storage systems and/or execution environments. Accordingly, migrating the workload from the first host (1202) to the second host (1204) may be facilitated by approaches set forth above with respect to migrating workloads across storage systems or disparate execution environments.

Figure 13:
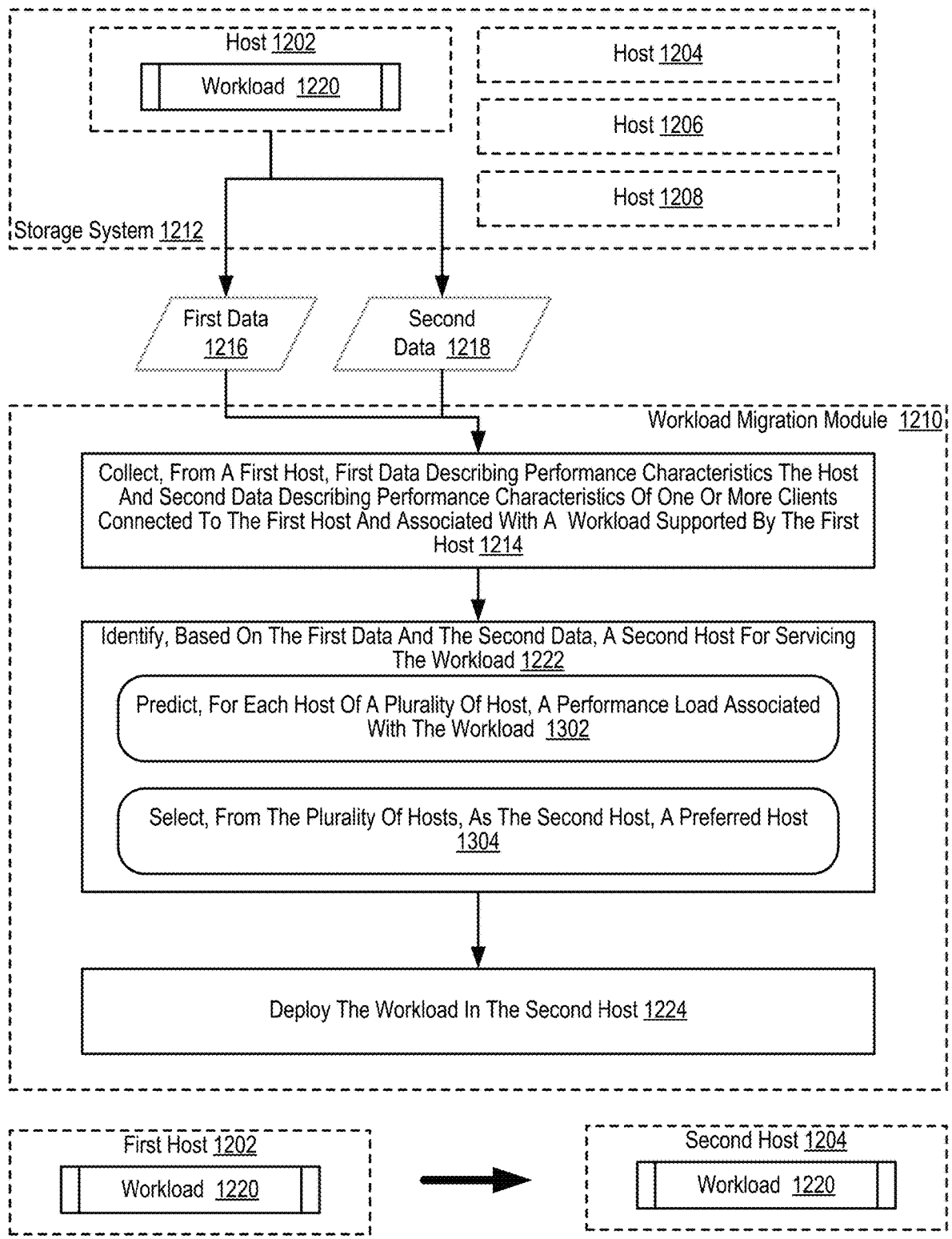
FIG. 13 sets forth a flow chart illustrating an additional example method of providing application-aware analytics for storage systems in accordance with some embodiments of the present disclosure.

For further explanation, FIG. 13 sets forth a flow chart illustrating an example method of providing application-aware analytics for storage systems (1202, 1204, 1206, 1208) in accordance with some embodiments of the present disclosure that includes collecting (1214), by a workload migration module (1210), from a first host (1202), first data (1216) describing performance characteristics of the first host (1202) and second data (1218) describing performance characteristics of one or more clients connected to the first host (1202) and associated with a workload (1220) supported by the first host (1202); identifying (1222), based on the first data (1216) and the second data (1218), a second host (1204) for servicing the workload (1220); and deploying (1224), by a workload migration module (1210), the workload (1220) in the second host (1204).

The method of FIG. 13 differs from FIG. 12 in that identifying (1222), based on the first data (1216) and the second data (1218), a second host (1204) for servicing the workload (1220) includes predicting (1302) (e.g., by the workload migration module (1210)), for each host (1204, 1206, 1208) of a plurality of hosts (1204, 1206, 1208), a performance load associated with the workload (1220). The predicted performance load of a respective host (1204, 1206, 1208) indicates one or more predicted (e.g., a time-series analysis) performance characteristics for supporting the workload (1220) by a respective host (1204, 1206, 1208). Accordingly, the predicted performance load may indicate predicted performance characteristics of a respective host (1204, 1206, 1208) supporting the workload and/or predicted performance characteristics of clients connected to a respective host (1204, 1206, 1208) supporting the workload (1220). For example, each host (1204, 1206, 1208) may correspond to a respective load model for predicting performance loads. Each load model may accept, as input, indications of the workload (1220), descriptions of clients associated with the workload (1220), the first data (1216), and/or the second data (1218). Each load model may then provide, as output, a predicted performance load for the respective host (1204, 1206, 1208) for supporting the workload (1220).

The method of FIG. 13 further differs from FIG. 12 in that identifying (1222), based on the first data (1216) and the second data (1218), a second host (1204) for servicing the workload (1220) also includes selecting (1304), from the plurality of hosts (1204, 1206, 1208), as the second host (1204), a preferred host. For example, a preferred host may be selected by performing a best-fit analysis on the predicted performance loads described above. A preferred host may also be selected by comparing various performance characteristics and metrics in the predicted performance loads and select a preferred host having a lowest or greatest metric (e.g., lowest change in processing resource usage or storage resource usage, highest predicted request processing rate, etc.).

Readers will appreciate that, in some embodiments, predicted performance loads for the first host (1202) may also be generated and taken into consideration when identifying (1222) a preferred host. In some circumstances, the first host (1202) may be determined to be the preferred host based on projected performance loads for hosts (1202, 1204, 1206, 1208). Accordingly, the workload (1220) would not be redeployed to a second host (1204).

Figure 14:
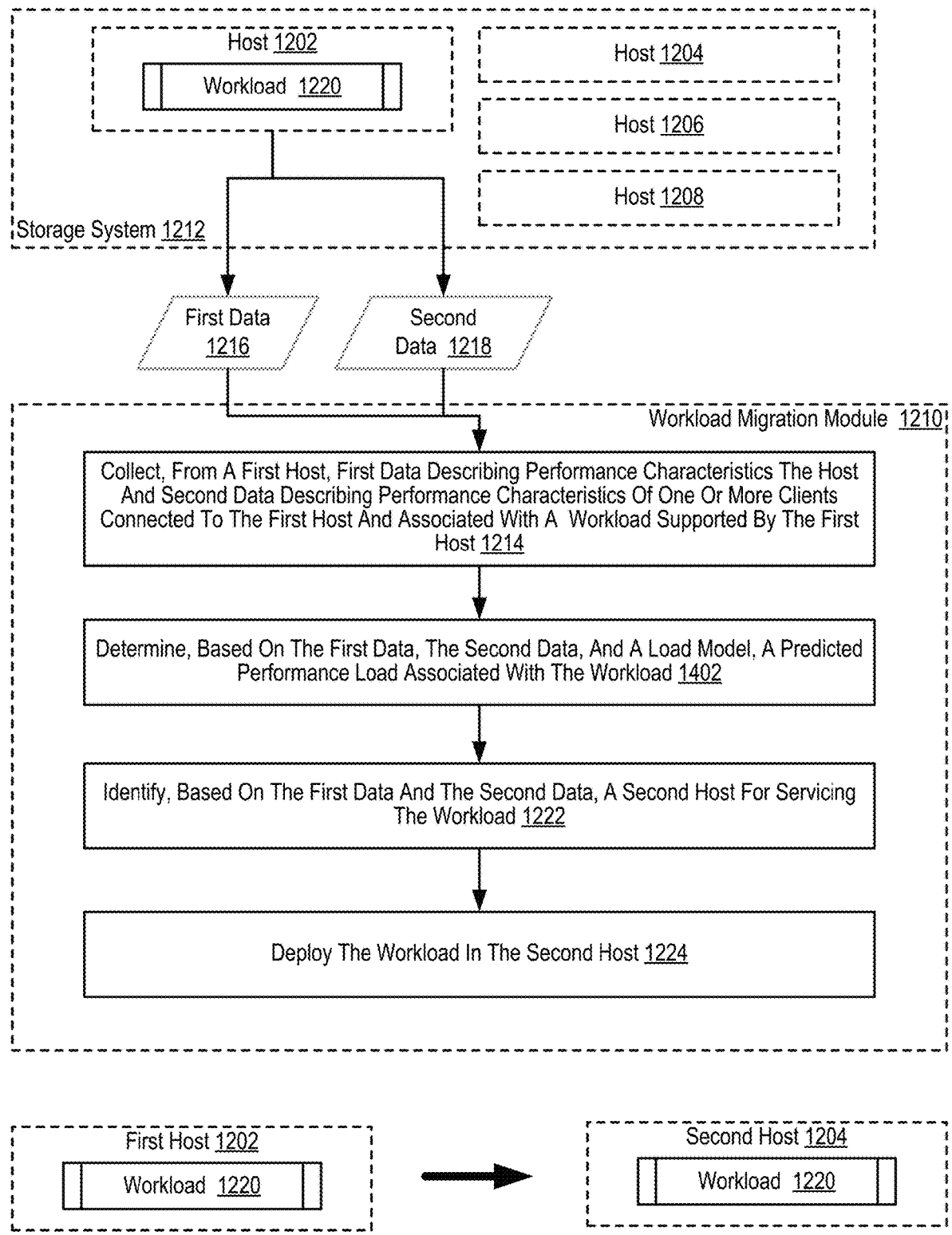
FIG. 14 sets forth a flow chart illustrating an additional example method of providing application-aware analytics for storage systems in accordance with some embodiments of the present disclosure.

For further explanation, FIG. 14 sets forth a flow chart illustrating an example method of providing application-aware analytics for storage systems (1202, 1204, 1206, 1208) in accordance with some embodiments of the present disclosure that includes collecting (1214), by a workload migration module (1210), from a first host (1202), first data (1216) describing performance characteristics of the first host (1202) and second data (1218) describing performance characteristics of one or more clients connected to the first host (1202) and associated with a workload (1220) supported by the first host (1202); identifying (1222), based on the first data (1216) and the second data (1218), a second host (1204) for servicing the workload (1220); and deploying (1224), by a workload migration module (1210), the workload (1220) in the second host (1204).

The method of FIG. 14 differs from FIG. 12 in that the method of FIG. 14 also includes determining (1402), based on the first data (1216), the second data (1218), and a load model, a predicted performance load associated with the workload (1220). The predicted performance load may indicate one or more predicted (e.g., time-series projected) performance characteristics of the first host (1202) and/or one or more clients connected to the first host (1202) in association with the workload. For example, the first host (1202) may correspond to a particular load model that accepts, as input, a description of the workload (1220), the first data (1216), the second data (1218), and potentially other data, and provide, as output, the predicted performance load. Accordingly, identifying (1222) the second host (1204) for servicing the workload (1220) may be performed in one or more performance characteristics indicated in the predicted performance load exceeding or falling below a threshold within a predefined time window. The predicted performance load may also be used in comparison with predicted performance loads for other hosts (1204, 1206, 1208) to determine which host (1202, 1204, 1206, 1208) is a preferred host for servicing the workload (1220).

Readers will appreciate that embodiments of the present disclosure can improve the operation of individual storage systems as well as fleets of storage systems. In fact, the embodiments described above can result in the intelligent placement of workloads within individual storage systems and across a fleet of storage systems, as the performance capabilities of each storage system may be intelligently aligned with the performance load that is generated by each workload and by a collection of workloads. In such a way, system resources may be efficiently utilized without overwhelming individual storage systems. Furthermore, actions (e.g., an automated software upgrade) may be initiated upon the detection of a possible overconsumption of performance resources, such that the storage systems can experience less downtime as problems may be resolved before the problems actually occur, rather than reactively addressing problems as they arise.

In some embodiments of the present disclosure, when a particular workload (or volume) is moved from a first storage system to a second storage system, the amount of performance capacity and even storage capacity that will become available on the first storage system may be determined, presented to a user such as a system admin, or otherwise utilized. One issue, however, is that moving a particular workload (or volume) may require that snapshots of volume or snapshots otherwise associated with the workload may also need to be moved to the second storage system. Because any of this data (e.g., the data in the volume or portions of the snapshot) may be deduplicated, however, it may be challenging to ascertain the size of the particular volume and its related snapshots, as moving some data may not actually cause that data to be removed from the first storage system. Consider an example in which a particular block of data is written to a first volume on a first storage system, the particular block of data is written to a second volume on the first storage system, and a deduplication process ultimately deletes one copy of the block of data from the first storage system, such that the first volume and the second volume point to the single copy of the block of data that resides on the first storage system. If the first volume is subsequently moved to a second storage system, the block of data does not get deleted from the first storage system as the second volume still requires that a copy of that data block be retained by the first storage system. As such, when predicting how much storage capacity will be gained on the first storage system as a result of moving the first volume to another storage system, the amount of space that will be gained may be expressed using upper and lower bounds to effectively form a range. In some embodiments, the upper bound could be equal to the sum of the provisioned size of the volume and the snapshots provisioned space, while the lower bound could be equal to the sum of the volume's unique space (i.e., volume data that is not common with the data from other volumes or snapshots) and the snapshot's unique space. Readers will appreciate that other formulas may be used to calculate the upper and lower bounds.

Embodiments of the present disclosure can also include GUIs that may be used to provide and interact with the functionality described above. The GUIs may be configured to illustrate the impact on a single storage system or a fleet of storage system if a particular action were taken, including deleting a volume, migrating a volume, or scaling the volume over time. The GUI may be configured to display a list of workloads that are supported by each of the storage system, where a user can select one of the display workloads and select various actions to take. For example, a user could select the action of "migrate" where the GUI would then present a list of storage systems that the user could migrate the selected workload to. In fact, available target storage systems may be presented in one way (e.g., normal text) whereas unavailable target storage systems may be presented in another way (e.g., greyed out text). A particular storage system may be unavailable as a migration target, for example, because the storage system does not have sufficient capacity to support the workload, because the storage system has been designated as being unavailable, or for other reasons. Likewise, the GUI could support actions such as "copy" (where a copy of a workload is created on a second storage system), "delete", or many others. In fact, the GUI could support a "simulation" function where performing some other action (e.g., migrate, copy, delete) is simulated in the sense that the impact on each storage system is displayed so that a user can determine whether to actually perform the action. The impact on each storage system could include, for example, displaying the projected impact on available storage capacity in each storage system that would result from performing the action, displaying the predict performance load on each storage that would result from performing the action, and so on. Such a simulate function could also be used to display the impact on one or more storage systems that would result from modifying any of the storage systems (e.g., adding additional storage devices, performing a software upgrade), including illustrating how workloads would be migrated if the modification were to actually take place.

Embodiments of the present disclosure may also take into consideration whether one or more volumes on a particular storage system are being replicated when determining where workloads should reside. In such an example, if a particular volume is being replicated, recovery point objectives may be taken into account and workloads may be placed on the storage system only if the storage system can still meet its recovery point objectives. For example, a particular workload may not be placed on a particular storage system if the storage system does not have the performance capacity to support the workload and maintain recovery point objectives for replicated volumes on the storage system. As such, embodiments of the present disclosure may use machine learning to develop a model to predict if a given protection group with meet its RPO. Furthermore, modifications may be made to peak performance models and sustained performance models to take replication features into account for arrays that replicate datasets.

Readers will appreciate that although the previous paragraphs relate to embodiments where steps may be described as occurring in a certain order, no ordering is required unless otherwise stated. In fact, steps described in the previous paragraphs may occur in any order. Furthermore, although one step may be described in one figure and another step may be described in another figure, embodiments of the present disclosure are not limited to such combinations, as any of the steps described above may be combined in particular embodiments.

Example embodiments are described largely in the context of a fully functional computer system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Embodiments can include be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
    collecting, by a workload migration module, from a first storage system, first data describing performance characteristics of the first storage system and second data from one or more clients describing resources used by a client application connected to the first storage system and associated with a workload supported by the first storage system;
    identifying, by the workload migration module based on the first data and the second data, a second storage system for servicing the workload; and
    deploying, by the workload migration module, the workload to utilize the second storage system.

2. The method of claim 1, wherein the first storage system is configured to receive, via a host agent, the second data from the one or more clients.

3. The method of claim 1, wherein identifying a second storage system comprises:
    predicting, for each storage system of a plurality of storage systems, a performance load associated with the workload, wherein the performance load is predicted dependent on the first data and the second data; and
    selecting, from the plurality of storage systems, as the second storage system, a preferred storage system.

4. The method of claim 1, wherein deploying the workload to utilize the second storage system comprises connecting the one or more clients to the second storage system.

5. The method of claim 1 further comprising determining, based on the first data, the second data, and a load model, a performance load associated with the workload.

6. A computer program product disposed upon a non-transitory computer readable storage medium, the computer program product comprising computer program instructions that, when executed, cause a computer to carry out the steps of:
  collecting, by a workload migration module, from a first host, first data describing performance characteristics of the first storage system and second data from one or more clients describing resources used by a client application connected to the first storage system and associated with a workload supported by the first storage system;
  identifying, by the workload migration module based on the first data and the second data, a second storage system for servicing the workload; and
  deploying, by the workload migration module, the workload to utilize the second storage system.

7. The computer program product of claim 6, wherein the first storage system is configured to receive, via a host agent, the second data from the one or more clients.

8. The computer program product of claim 6, wherein identifying a second storage system comprises:
  predicting, for each storage system of a plurality of storage systems, a performance load associated with the workload, wherein the performance load is predicted dependent on the first data and the second data; and
  selecting, from the plurality of storage systems, as the second storage system, a preferred storage system.

9. The computer program product of claim 6, wherein deploying the workload to utilize the second storage system comprises connecting the one or more clients to the second storage system.

10. The computer program product of claim 6 further comprising determining, based on the first data, the second data, and a load model, a performance load associated with the workload.

11. An apparatus including a computer processor, a computer memory operatively coupled to the computer processor, the computer memory having disposed within it computer program instructions that, when executed by the computer processor, cause the storage system to carry out the steps of:
  collecting from a first storage system, first data describing performance characteristics of the first storage system and second data from one or more clients describing resources used by a client application connected to the first storage system and associated with a workload supported by the first storage system;
  identifying, by the workload migration module based on the first data and the second data, a second storage system for servicing the workload; and
  deploying, by the workload migration module, the workload to utilize the second storage system.

12. The apparatus of claim 11, wherein the first storage system is configured to receive, via a host agent, the second data from the one or more clients.

13. The apparatus of claim 11, wherein identifying a second storage system comprises:
  predicting, for each host of a plurality of storage systems, a performance load associated with the workload, wherein the performance load is predicted dependent on the first data and the second data; and
  selecting, from the plurality of storage systems, as the second storage system, a preferred storage system.

14. The apparatus of claim 11, wherein deploying the workload to utilize the second storage system comprises connecting the one or more clients to the second storage system.

15. The apparatus of claim 11 further comprising determining, based on the first data, the second data, and a load model, a performance load associated with the workload.

* * * * *